(12) United States Patent
Yoshida

(10) Patent No.: US 7,061,213 B2
(45) Date of Patent: Jun. 13, 2006

(54) DC-DC CONVERTER

(75) Inventor: Yutaka Yoshida, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/613,017

(22) Filed: Jul. 7, 2003

(65) Prior Publication Data

US 2005/0057238 A1    Mar. 17, 2005

(30) Foreign Application Priority Data

Jul. 11, 2002  (JP) .............................. 2002-202090
Nov. 1, 2002  (JP) .............................. 2002-319634

(51) Int. Cl.
*G05F 1/613* (2006.01)

(52) U.S. Cl. .................... 323/224; 323/283; 330/10

(58) Field of Classification Search ................ 323/282, 323/288, 285, 224, 222, 284, 271, 272, 223; 363/19, 26, 80, 97, 20
See application file for complete search history.

(56) References Cited

U.S. PATENT DOCUMENTS 5,912,552 A * 6/1999 Tateishi ....................... 323/285
6,469,483 B1 * 10/2002 Katayama ................... 323/282
6,489,756 B1 * 12/2002 Kanouda et al. ............ 323/284

FOREIGN PATENT DOCUMENTS

| JP | 11-155281   | 6/1999 |
| JP | 2001-112251 | 4/2001 |
| JP | 2001-157446 | 6/2001 |
| JP | 2001-258245 | 9/2001 |
| JP | 2002-78326  | 3/2002 |

\* cited by examiner

*Primary Examiner*—Rajnikant B. Patel
(74) *Attorney, Agent, or Firm*—Manabu Kanesaka

(57) ABSTRACT

A DC—DC converter switches a semiconductor switch device for converting a DC voltage to a certain level and supplies the converted DC voltage to a load. The DC—DC converter is configured to be able to switch between a first feedback control mode and a second feedback control mode. The DC—DC converter selects the second feedback control mode when a load current flowing through the load is below a predetermined value. The DC—DC converter selects the first feedback control mode when a level of the DC voltage supplied to the load changes irrespective of a value of the load current.

14 Claims, 33 Drawing Sheets

Fig. 6

| load conditions \ output voltages | no change (req2=Low) | change (req2=High) |
|---|---|---|
| light load (req1=Low) | PWM/PFM =Low | PWM/PFM =High |
| heavy load (req1=High) | PWM/PFM =High | PWM/PFM =High |

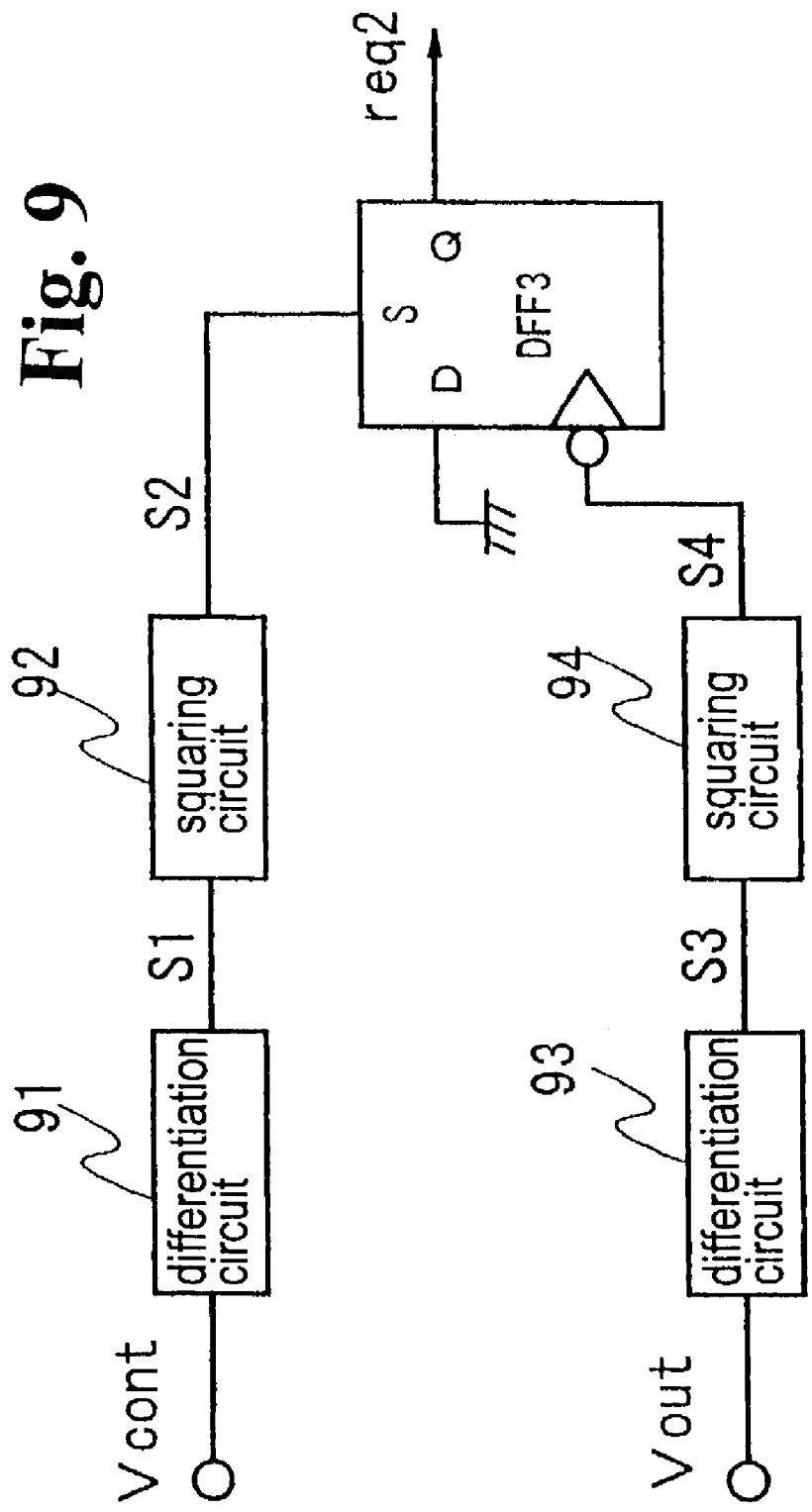

Fig. 10(a)
Vcont

Fig. 10(b)
Vout

Fig. 10(g)
req2

Fig. 12(a) Vcont
Fig. 12(b) Vout
Fig. 12(c) Verr
Fig. 12(d) VR1
Fig. 12(e) Vcmp6
Fig. 12(f) Vcmp7
Fig. 12(g) req2

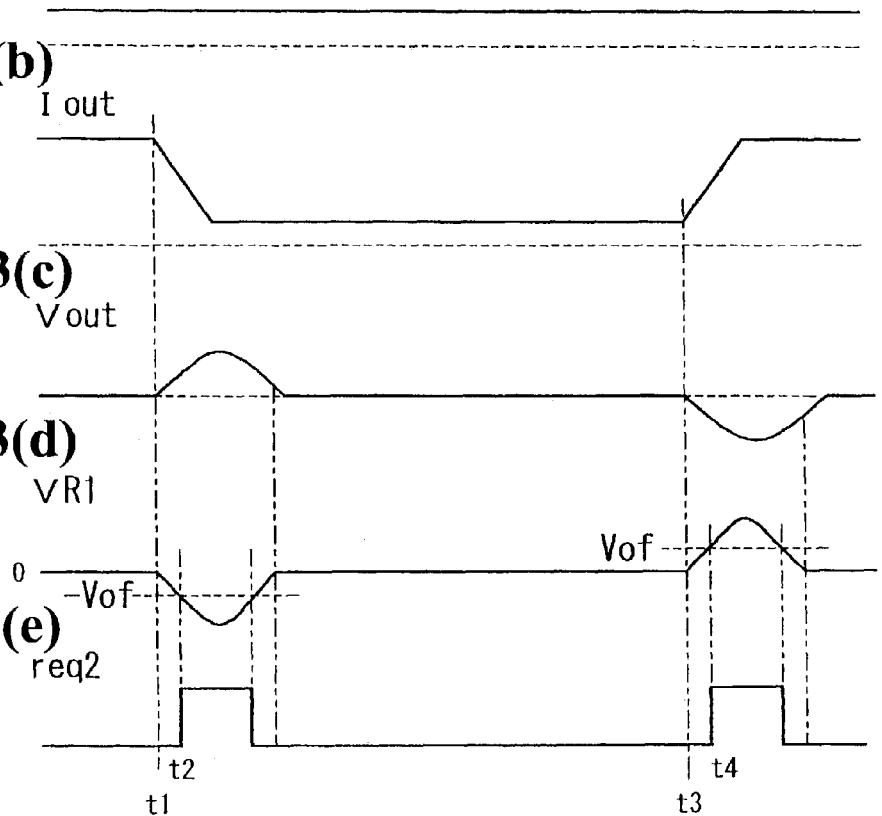

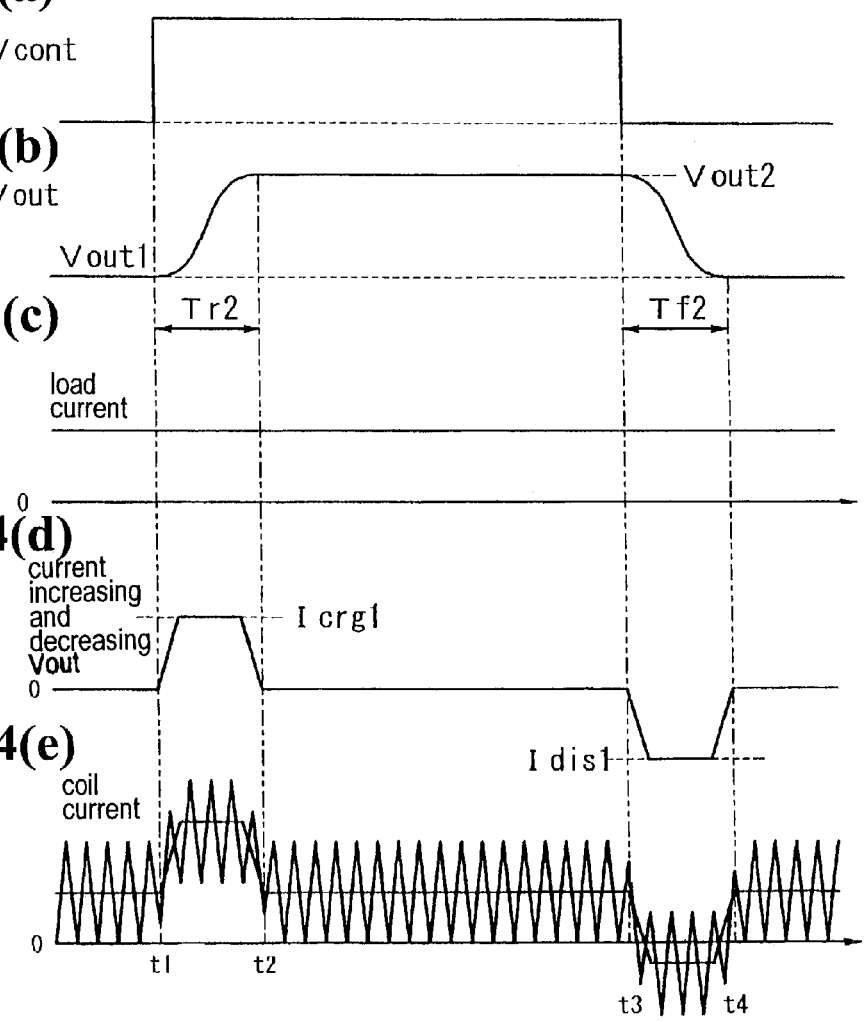

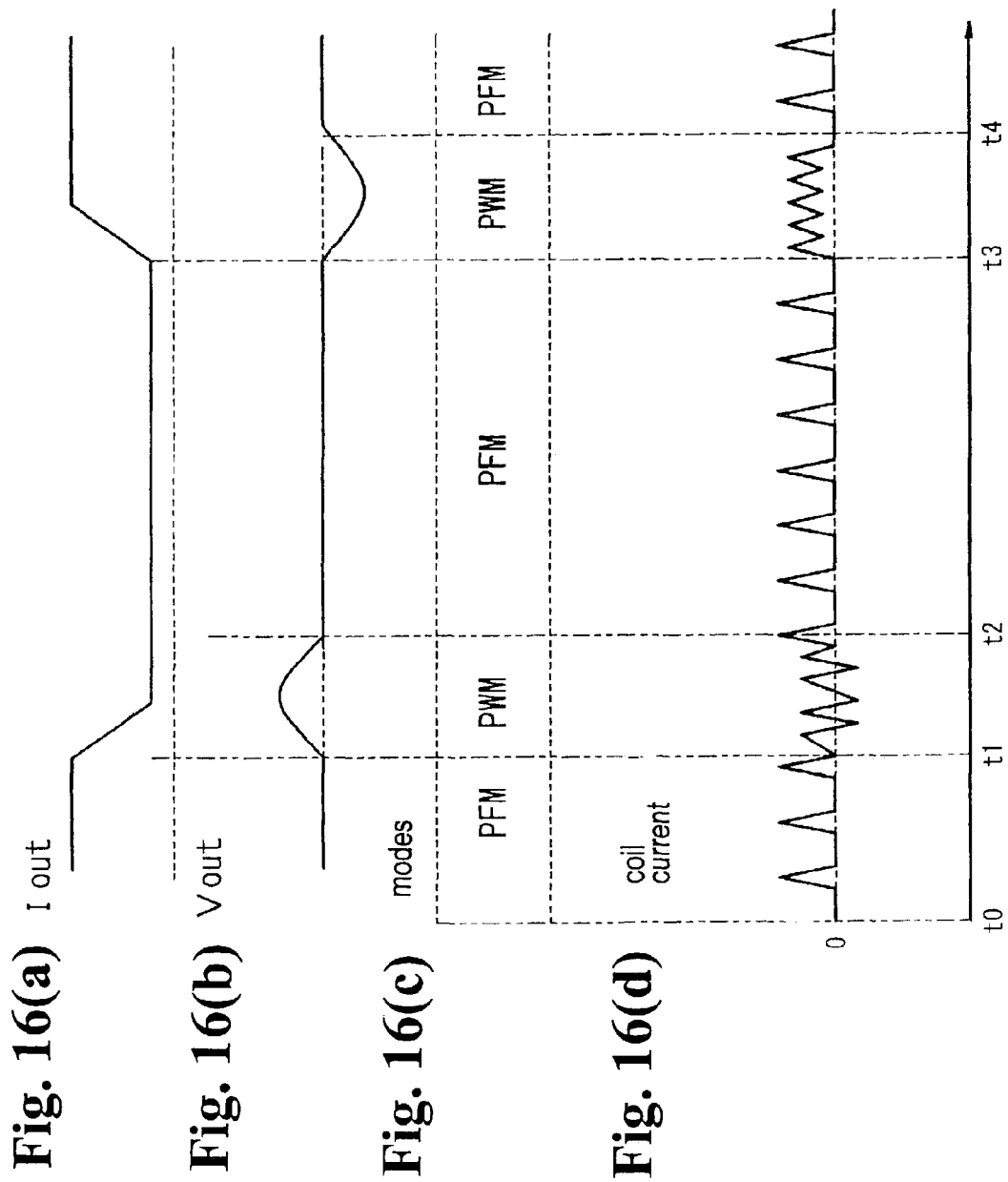

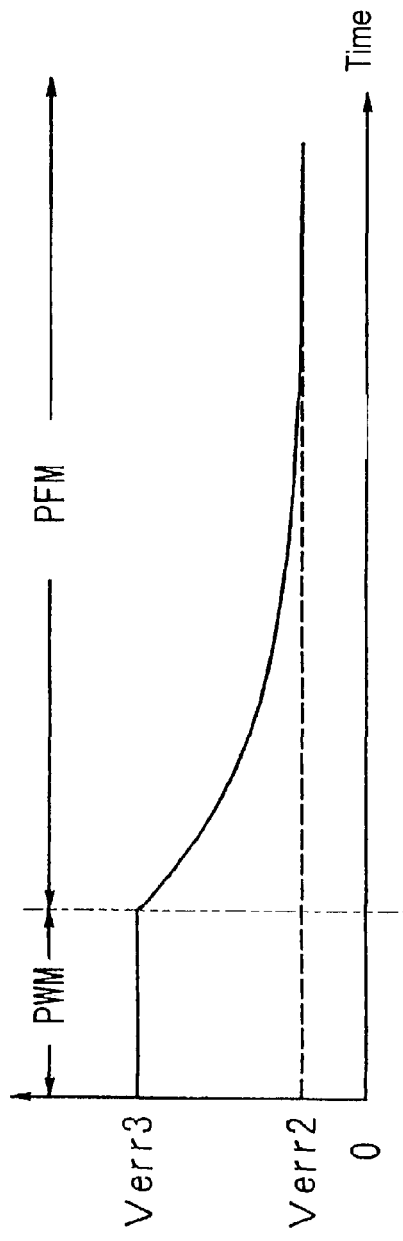
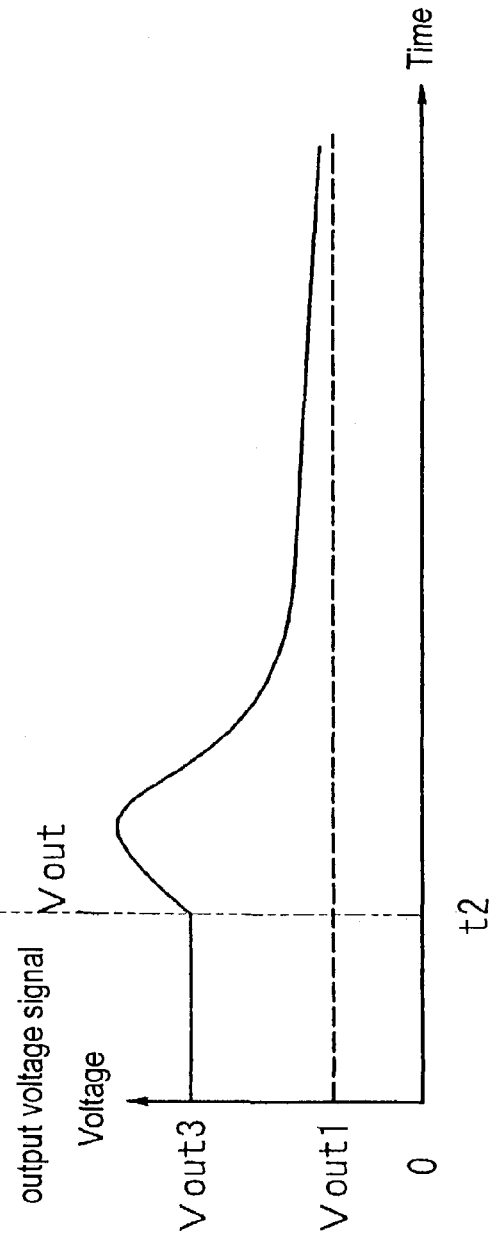
Fig. 25(a)
Fig. 25(b)

Fig. 33(a) Prior Art
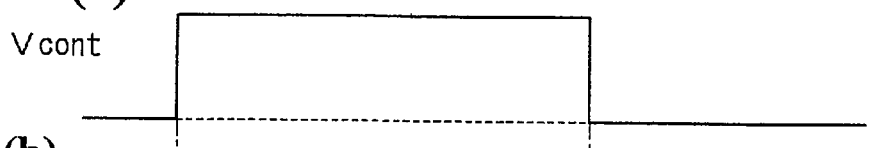
Fig. 33(b) Prior Art Vout
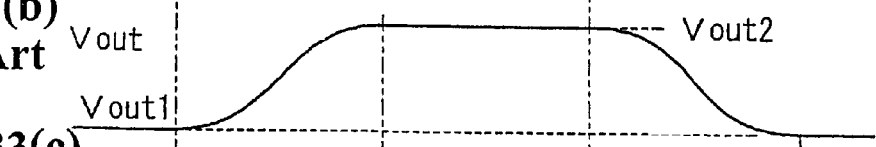
Fig. 33(c) Prior Art load current
Fig. 33(d) Prior Art Current increasing or decreasing Vout
Fig. 33(e) Prior Art coil current
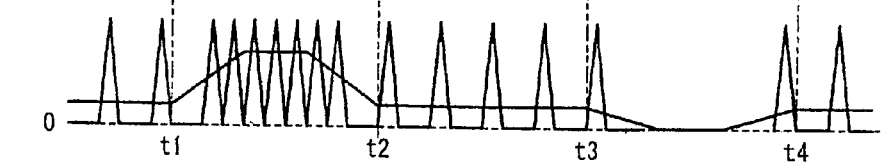

DC-DC CONVERTER

BACKGROUND OF THE INVENTION AND RELATED ART STATEMENT

The invention relates to a DC—DC converter for switching a semiconductor switch device to convert a DC voltage to a certain level and for supplying the DC voltage to a load. Specifically, the invention relates to a DC—DC converter that reduces a switching loss of the semiconductor switch device even when an output voltage fluctuates.

A DC—DC converter switches a semiconductor switch device to convert a DC voltage, and conducts feedback control to maintain an output voltage supplied to a load at a certain value. In this case, when a load current becomes below 20 to 30% of a rated current, the switch device converts the voltage through the switching with extremely low efficiency. In order to prevent the voltage conversion efficiency from lowering at a low load current, in a known method, a switching frequency is lowered according to the decease in the load current to reduce a loss associated with the switching of the switch device.

Conventional feedback control methods for the DC—DC converter include pulse width modulation (hereinafter referred to as "PWM") and pulse frequency modulation (hereinafter referred to as "PFM"). Japanese Patent Publications (Kokai) No. 11-155281, No. 2001-112251, and No. 2001-157446 have disclosed DC—DC converters employing, in addition to the PWM control mode, the PFM control mode in which the switching frequency is lowered in response to the decrease in the load current to maintain high conversion efficiency in a wide load range.

The PWM control mode for the DC—DC converter will be described next. FIG. 29 is a block circuit diagram of a step-down DC—DC converter with the PWM control mode.

In the step-down DC—DC converter, an input power supply voltage Vin is converted to a certain voltage level and is supplied to a load LOAD. The step-down DC—DC converter includes an error amplifier Amp1, a capacitor C1 for phase compensation, a resistance R1 for phase compensation, a feedback resistance R2, a feedback resistance R3, an oscillator circuit OSC2, a comparator Cmp1 for pulse width modulation, a p-channel output transistor (MOSFET) P1, an n-channel output transistor (MOSFET) N1, a choke coil L, a driver circuit Dr1, a driver circuit Dr2, and a smoothing capacitor Cout.

In the step-down DC—DC converter with the PWM control mode, a resistance divides an output voltage signal Vout to obtain a feedback signal Vfb, and it is controlled so that the feedback signal Vfb is equal to an output voltage control signal Vcont for determining the output voltage signal Vout. For example, when the feedback resistance R1 and the feedback resistance R2 for dividing the output voltage signal Vout have the same value, the output voltage signal Vout is twice as high as the output voltage control signal Vcont.

The output voltage control signal Vcont is connected to a positive input terminal of the error amplifier (operational amplifier) Amp1. The feedback signal Vfb is connected to a negative input terminal of the error amplifier Amp1. The error amplifier Amp1 constitutes an integration circuit using the phase compensation resistance R1 and the phase compensation capacitor C1. An error amplifier output signal Verr from the error amplifier Amp1 and a triangular wave signal Vosc2 from the oscillator circuit OSC2 are inputted to the comparator Cmp1 for pulse width modulation.

A source of the p-channel transistor P1 is connected to the input power supply voltage Vin and a drain of the p-channel transistor P1 is connected to the choke coil L. The driver circuit Dr1 drives a gate of the p-channel transistor P1. The n-channel transistor N1 is connected to the ground potential GND and the choke coil L. The driver circuit Dr2 drives a gate of the n-channel transistor N1. The output voltage signal Vout is converted to the DC voltage by the choke coil L and the smoothing capacitor Cout, and is supplied to the load LOAD.

The PMW control mode of the DC—DC converter will be described next. The oscillator circuit OSC2 oscillates at a predetermined frequency and outputs a triangular wave signal Vosc2. The triangular wave signal Vosc2 and the error amplifier output signal Verr are inputted to the comparator Cmp1 for pulse width modulation. The comparator Cmp1 outputs a pulse-width-modulation signal Vcmp to the driver circuits Dr1 and Dr2. When the signal Vcmp is "Low", the p-channel transistor P1 is switched on. When the signal Vcmp is "High", the n-channel transistor N1 is switched on. The driver circuits Dr1 and Dr2 adjust timings thereof so that the p-channel transistor P1 and the n-channel transistor N1 are not switched on at the same time to prevent a through current from flowing from the input power supply voltage Vin to the ground potential GND.

When the p-channel transistor P1 is on, electric charges flow from the input power supply voltage Vin to the smoothing capacitor Cout via the choke coil L, so that a current flowing through the choke coil L increases. When the n-channel transistor N1 is switched on, electric charges flow from the ground potential GND to the smoothing capacitor Cout, so that the current flowing through the choke coil L decreases. The feedback resistance R2 and the feedback resistance R3 divide the output voltage signal Vout to generate the feedback signal Vfb. The feedback signal Vfb is inputted to the error amplifier Amp1 together with the output voltage control signal Vcont, and the feedback control is conducted so that the feedback signal Vfb becomes equal to the output voltage control signal Vcont.

The feedback control will be described below with reference to FIGS. 30(a) and 30(b). FIGS. 30(a) and 30(b) are views showing operational waveforms in the PWM control mode of the step-down DC—DC converter.

A period of time when the p-channel transistor P1 is on is defined as ton, and a period of time when the n-channel transistor N1 is on is defined as toff. In this case, a ratio of the output voltage signal Vout and the input power supply voltage Vin is given by the following expression.

$$Vout/Vin=ton/(ton+toff)$$

In the following, the ratio, ton/(ton+toff), will be referred to as a duty ratio.

A case that the error amplifier output signal Verr drops from a state shown in FIG. 30(a) to a state shown in FIG. 30(b) will be considered. In a case that the output voltage signal Vout increases when a current flowing in the load LOAD (hereinafter referred to as the "load current") changes, the feedback signal Vfb obtained by dividing the output voltage signal Vout by the resistance also increases. As a result, the error amplifier output signal Verr drops. Accordingly, the ON-period ton of the p-channel transistor P1 decreases and the ON-period toff of the n-channel transistor N1 increases to lower a voltage of the output voltage signal Vout. The feedback control of the DC—DC converter is performed as described above, so that the output voltage signal Vout remains constant even when the load current changes.

The PFM control mode will be described next. FIG. 31 is a block circuit diagram of a step-down DC—DC converter with the PFM control mode. As shown in FIG. 31, the step-down DC—DC converter includes an error amplifier Amp1, a capacitor C1 for phase compensation, a resistance R1 for phase compensation, a feedback resistance R2, a feedback resistance R3, an oscillator circuit OSC3, a comparator Cmp1 for pulse width modulation, a one-shot circuit One-shot, a p-channel output transistor (MOSFET) P1, a diode D1, a choke coil L, a driver circuit Dr1, and a smoothing capacitor Cout.

In the same manner as the circuit shown in FIG. 29, a resistance divides an output voltage signal Vout to obtain a feedback signal Vfb, and it is controlled so that the feedback signal Vfb is equal to an output voltage control signal Vcont supplied from outside. For example, when the feedback resistance R1 and the feedback resistance R2 for dividing the output voltage signal Vout have the same value, the output voltage signal Vout is twice as high as the output voltage control signal Vcont.

The output voltage control signal Vcont is connected to the positive input terminal of the error amplifier Amp1. The feedback signal Vfb is connected to the negative input terminal of the error amplifier Amp1. The error amplifier Amp1 constitutes an integration circuit using the phase compensation resistance R1 and the phase compensation capacitor C1. The error amplifier output signal Verr from the error amplifier Amp1 and the triangular wave signal Vosc3 from the oscillator circuit OSC3 are inputted to the comparator Cmp1 for pulse width modulation. The error amplifier output signal Verr is inputted also to the oscillator circuit OSC3.

The source of the p-channel transistor P1 is connected to the input power supply voltage Vin and the drain of the p-channel transistor P1 to the choke coil L. The driver circuit Dr1 drives the gate of the p-channel transistor P1. A pulse signal Vpls outputted from the one-shot circuit One-shot is used for the gate signal of the p-channel transistor P1. The one-shot circuit One-shot generates the pulse signal Vpls having a certain time width using a transitional point of the pulse-width-modulation signal Vcmp as a trigger. The feedback diode D1 is connected between the ground potential GND and the choke coil L. The choke coil L and the smoothing capacitor Cout convert the output voltage signal Vout to the DC voltage, and the output voltage signal Vout is supplied to the load LOAD.

When the voltage of the output voltage control signal Vcont increases, the error amplifier output signal Verr increases, and an oscillation frequency of the triangular wave signal Vosc3 outputted from the oscillator circuit OSC3 increases. As a result, the switching frequency of the p-channel transistor P1 increases, the current flowing to the smoothing capacitor Cout through the choke coil L increases, and the output voltage signal Vout increases. Thus, in the PFM control mode, the voltage of the output voltage signal Vout is controlled based on the voltage of the output voltage control signal Vcont through the feedback control.

FIGS. 32($a$) to 32($d$) are views showing waveforms in the PFM control mode of the DC—DC converter.

FIG. 32($a$) shows a waveform representing the error amplifier output signal Verr and the triangular wave signal Vosc3 inputted to the comparator Cmp1 for the pulse width modulation. The oscillator circuit OSC3 outputs the triangular wave signal Vosc3 having a frequency corresponding to the error amplifier output signal Verr.

FIG. 32($b$) shows a waveform representing the pulse-width-modulation signal Vcmp. The comparator for the pulse width modulation Cmp1 compares the error amplifier output signal Verr with the triangular wave signal Vosc3, and outputs the pulse-width-modulation signal Vcmp to the one-shot circuit One-shot.

FIG. 32($c$) shows a waveform representing the pulse signal Vpls outputted from the one-shot circuit One-shot. The pulse signal Vpls, triggered by the transitional point of the pulse-width-modulation signal Vcmp and having a certain time width tpluse, is outputted to the driver circuit Dr1. Since the p-channel transistor P1 is switched on by the driver circuit Dr1 during the "Low" period of the pulse signal Vpls, a current flows from the input power supply voltage Vin into the choke coil L via the p-channel transistor P1.

FIG. 32($d$) shows a waveform representing the current flowing through the choke coil L. The coil current IL increases from 0 at a slope of (Vin−Vout)/L relative to time after the p-channel transistor P1 is switched on. After the p-channel transistor P1 is switched off, a current flows from the choke coil L to the ground potential GND via the feedback diode D1. The current decreases at a slope of Vout/L relative to time.

The feedback resistance R2 and the feedback resistance R3 divide the output voltage signal Vout to generate the feedback signal Vfb. The feedback signal Vfb is inputted together with the output voltage control signal Vcont to the error amplifier Amp1. As a result, the output voltage control signal Vcont is controlled to be equal to the feedback signal Vfb through the feedback control.

In an actual case, the output voltage signal Vout is determined by a sum of the current flowing out from the smoothing capacitor Cout to the load LOAD and the current flowing into the smoothing capacitor Cout via the choke coil L. The feedback control is conducted so that these currents have the same value. In other words, the output voltage signal Vout increases when the load current decreases, and the feedback signal Vfb obtained by dividing the output voltage signal Vout by the resistance also increases. Therefore, when the error amplifier output signal Verr decrease, the oscillation frequency of the triangular wave signal Vosc3 decreases. As a result, the switching frequency of the p-channel transistor P1 decreases, and the current flowing into the smoothing capacitor Cout via the choke coil L decreases.

Thus, the DC—DC converter with the PFM control mode performs the feedback control to maintain the output voltage signal Vout at a certain value even when the load current changes.

Recently, a demand for changing the output voltage at a high speed when the DC—DC converter is in use has been increased. The conventional DC—DC converter generates a certain output voltage based on a fixed reference voltage. In contrast, instead of the conventional fixed reference voltage, it has been desired to provide a circuit configuration that changes the output voltage of the DC—DC converter based on, for example, a variable reference voltage supplied from outside.

For example, in a power amplifier used for a portable telephone set with the W-CDMA system, it is necessary to reduce a power consumption of the power supply incorporated in the portable telephone set. To this end, when the portable telephone set is positioned near the base station transmitting and receiving the radio waves, the transmission power is suppressed. In other words, the power supply voltage supplied to the power amplifier is changed corresponding to the power necessary for transmission.

In order to stably control the output voltage corresponding to a wide range of input voltages and load variations, Japanese Patent Publication (Kokai) No. 2001-258245 has disclosed a DC—DC converter in which a primary side driver circuit is switched between the time ratio modulation mode and the frequency modulation mode to follow the wide input voltage variations and the wide load variations.

In the integrated circuit shown in FIG. 29 formed of the error amplifier Amp1, the resistance R1 and the capacitor C1, Japanese Patent Publication No. 2002-78326 has described that when the output voltage control signal Vcont changes stepwise, the change directly affects an output of the error amplifier Amp1, thereby causing an overshoot.

As described above, in the DC—DC converter with the function of switching between the PWM control mode and the PFM control mode, it has been known to be possible to maintain the output voltage signal Vout at a certain value while exhibiting high conversion efficiency in a wide load range. However, in a case that the output voltage control signal Vcont inputted as a reference voltage changes rapidly under a light load, when the DC—DC converter is operated in the PFM mode, the output voltage signal Vout responses to the rapid change very slowly.

The response characteristic of the output voltage signal Vout will be further described next. FIGS. 33(a) to 33(e) are views showing waveforms describing a change in the output voltage signal Vout under the PFM control mode.

As shown in FIG. 33(a), the output voltage control signal Vcont increases at a time t1 and decreases at a time t3. According to the change in the output voltage control signal Vcont described above, the output voltage signal Vout increases from a potential Vout1 to a potential Vout2 for a period of time Tr1, and decreases from the potential Vout2 to the potential Vout1 for a period of time Tf1 as shown in FIG. 33(b).

A current of the output capacitance formed by the smoothing capacitor Cout is a sum of the load current and a current for changing the electric charge of the smoothing capacitor according to the change in the output voltage signal Vout. For the sake of the explanation, the load current is assumed to be constant as shown in FIG. 33(c) irrespective of the output voltage signal Vout. As shown in FIG. 33(d), the current flows in and out to change the electric charges in the smoothing capacitor Cout.

In the PFM control mode, as shown in FIG. 33(e), the change in the switching frequency controls the change in the current. Therefore, in the PFM control mode, it is difficult to follow the rapid change like the case in the PWM control mode.

In the portable telephone set with the W-CDMA system, it is necessary to change the power supply voltage in several tens of microseconds. It is not possible to flow the current in the negative direction when the voltage decreases (during the period between the time t3 and the time T4). The electric charges in the smoothing capacitor Cout can be discharged only by flowing the current to the load LOAD. When the load current is small, the period Tf1 necessary for decreasing the output voltage signal Vout from the potential Vout2 to the potential Vout1 takes too long to meet the requirement of several tens of microseconds described above.

In view of the problems described above, an object of the invention is to provide a DC—DC converter in which high efficiency in a wide load range is maintained and the response of the output voltage signal is not deteriorated under the light load condition.

It is also an object of the invention to provide a DC—DC converter in which overshooting of the output voltage signal does not occur even when the output voltage control signal changes stepwise.

A further object of the invention is to provide a DC—DC converter in which undershooting and overshooting are suppressed during the switching between the PWM control mode and the PFM control mode to minimize absolute values of the overshooting and the undershooting, and it is possible to shorten periods of the overshooting and the undershooting.

Further objects and advantages of the invention will be apparent from the following description of the invention.

SUMMARY OF THE INVENTION

In order to attain the objects described above, according to the first aspect of the invention, a DC—DC converter switches a semiconductor switch device for converting a DC voltage to a certain level, and for supplying the converted DC voltage to a load. The DC—DC converter is configured to be able to switch between a first feedback control mode and a second feedback control mode. The DC—DC converter selects the second feedback control mode when a load current flowing through the load is below a predetermined value. The DC—DC converter selects the first feedback control mode when the level of the DC voltage supplied to the load changes irrespective of a value of the load current.

In the DC—DC converter of the invention, the PWM control mode is performed when the output voltage changes irrespective of a state of the load. Therefore, it is possible to change a current for charging or discharging an output capacitance in a short period of time and to reduce a transient time of the output voltage.

According to the second aspect of the invention, a DC—DC converter switches a semiconductor switch device for converting a DC voltage to a certain value, and for supplying the converted DC voltage to a load. The DC—DC converter includes oscillating means for generating a triangular wave signal to define a switching frequency of the semiconductor switch device; amplifying means for amplifying a voltage difference between a voltage of an output voltage control signal as a reference voltage and a detected voltage fed back corresponding to a level of the DC converted voltage supplied to the load; pulse-width-modulation control means for switching a feedback control mode between a PWM control mode and a PFM control mode to compare the triangular wave signal from the oscillating means and the voltage difference from the amplifying means, and for modulating a pulse width of a driving pulse switching the semiconductor switching device; and control mode selection means for selecting the PFM control mode when a load current flowing through the load is below a predetermined value and the PWM control mode when the converted DC voltage supplied to the load changes irrespective of a value of the load current, when the pulse-width-modulation control means switches the feedback control mode.

According to the third aspect of the invention, in the DC—DC converter of the second aspect, the amplifying means includes a first analog amplifier circuit having a fixed operating point, and a second analog amplifier circuit connected to the first analog amplifier circuit in cascade and having a fixed operating point. Further, the first analog amplifier circuit is a differential amplifier circuit.

In the DC—DC converter of the third aspect, the oscillating means generates a triangular wave signal having an oscillation frequency proportional to a value of a current flowing through a first resistance circuit connecting between a node set at a potential of the difference voltage amplified by the amplifying means and a node set at the first reference voltage when the control mode selection means selects the PFM control mode. The oscillating means generates a triangular wave signal having an oscillation frequency proportional to a value of a current flowing through a second resistance circuit connecting between a second reference voltage and a ground potential when the control mode selection means selects the PWM control mode.

BRIEF DESCRIPTION OF THE DRAWINGS

FIG. 6 is a table showing a relationship between a PWM/PFM selection signal and load and voltage variations in the PWM/PFM selection circuit shown in FIG. 5;

FIG. 9 is a block circuit diagram of an output-voltage-change detection circuit in the PWM/PFM selection circuit shown in FIG. 5;

Figures 10A, 10B, 10C, 10D, 10E, 10F, 10G:
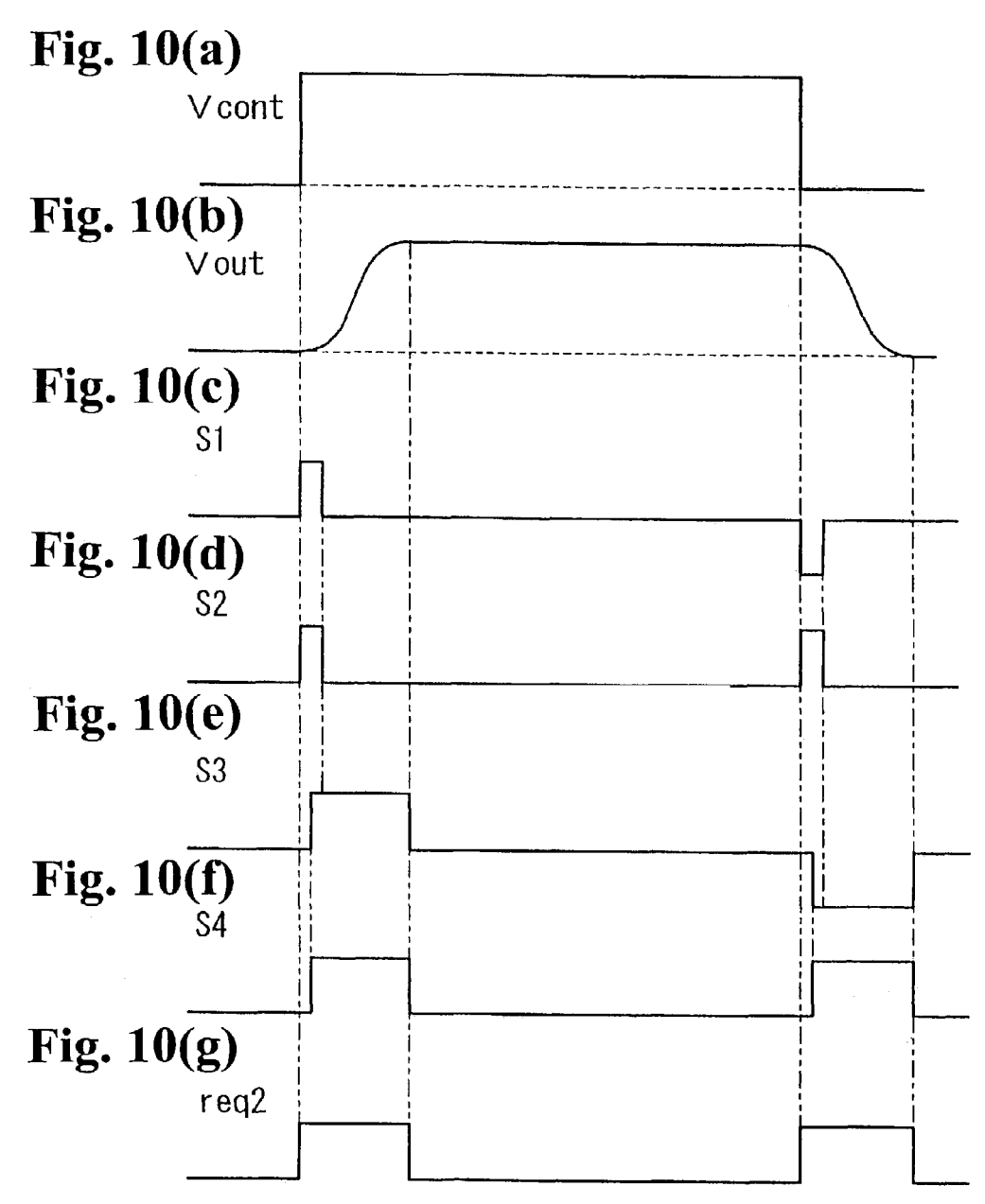

FIGS. 10(a) to 10(g) are charts showing waveforms representing an operation of each unit in the output-voltage-change detection circuit shown in FIG. 9;

FIGS. 12(a) to 12(g) are charts showing waveforms representing an operation of each unit in the output-voltage-change detection circuit shown in FIG. 11;

FIGS. 13(a) to 13(e) are charts showing waveforms representing an operation of each unit in the output-voltage-change detection circuit when a load current changes rapidly;

FIGS. 14(a) to 14(e) are charts showing waveforms representing changes in output voltage signals in the DC—DC converter shown in FIG. 1 controlled in an PWM control mode;

FIGS. 16(a) to 16(d) are charts showing waveforms representing changes in output voltage signals in the DC—DC converter shown in FIG. 1 when the load current changes rapidly;

FIGS. 25(a) and 25(b) are charts explaining overshooting when the DC—DC converter shown in FIG. 1 is switched from the PWM control mode to the PFM control mode.

FIGS. 33(a) to 33(e) are charts showing waveforms representing changes in output voltage signals in the PFM control mode.

DETAILED DESCRIPTION OF PREFERRED EMBODIMENTS

Figure 1:
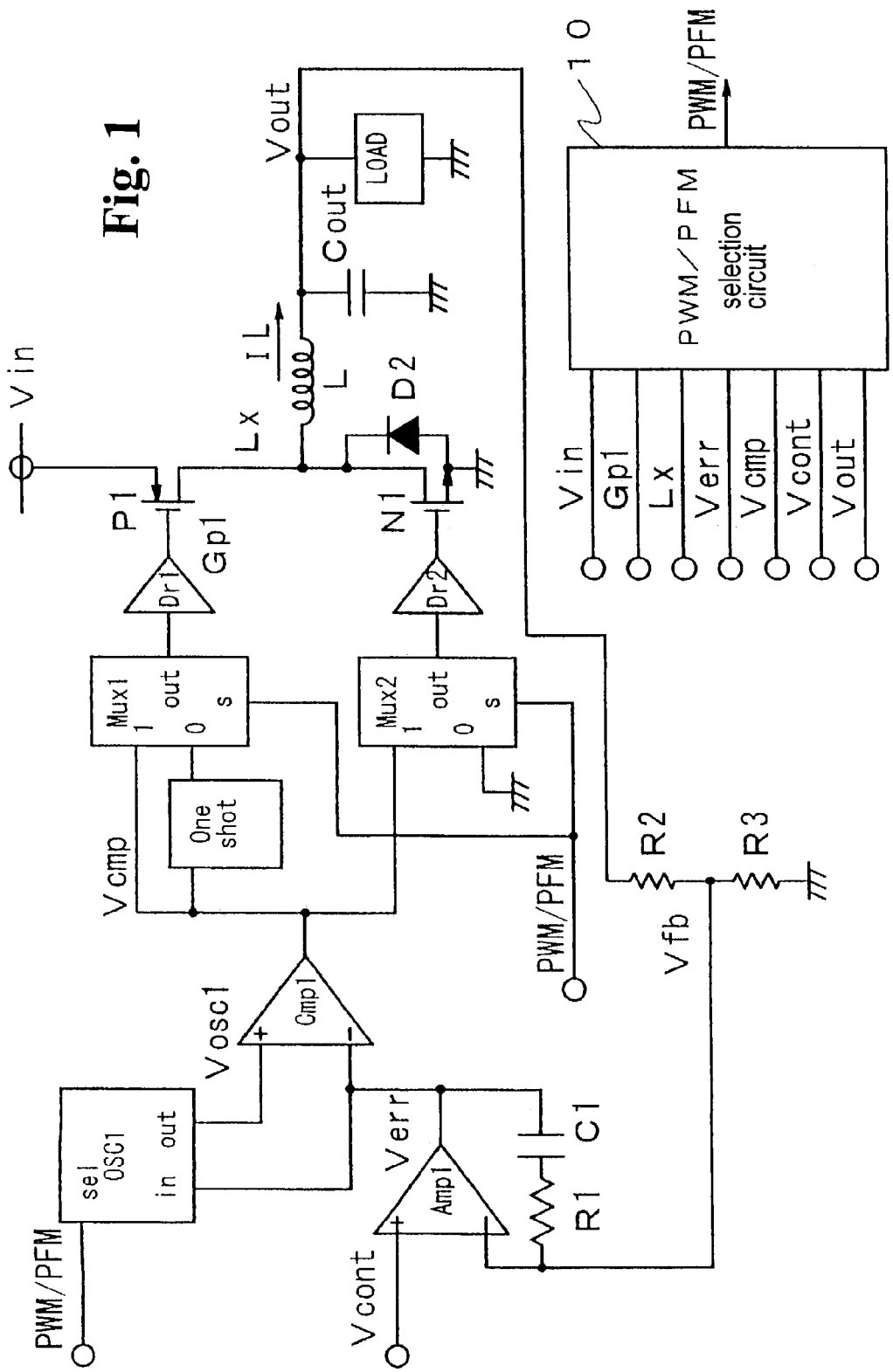
FIG. 1 is a block circuit diagram of a DC—DC converter according to the present invention.

Hereunder, embodiments of the invention will be described in detail with reference to the accompanying drawings. FIG. 1 is a block circuit diagram of a DC—DC converter according to the first embodiment of the invention. The DC—DC converter converts an input power supply voltage Vin to a certain voltage level and supplies the converted voltage to a load LAOD.

The DC—DC according includes an error amplifier (operational amplifier) Amp1, a capacitor C1 for phase compensation, a resistance R1 for phase compensation, a feedback resistance R2, a feedback resistance R3, an oscillator circuit OSC1, a comparator Cmp1 for pulse width modulation, a one-shot circuit one-shot, multi-plexer circuits Mux1 and Mux2, driver circuits Dr1 and Dr2, a p-channel transistor (MOSFET) P1 for outputting, an n-channel transistor (MOSFET) N1 for outputting, a choke coil L, a diode D2, a smoothing capacitor Cout, and a PWM/PFM selection circuit 10.

The PWM/PFM selection circuit 10 receives the input power supply voltage Vin, a gate signal Gp1 outputted from the driver circuit Dr1, a voltage signal Lx, an error amplifier output signal Verr, a pulse-width-modulation signal Vcmp, an output voltage control signal Vcont, and an output voltage signal Vout. The PWM/PFM selection circuit 10 outputs a selection signal PWM/PFM for selecting the PWM control mode or the PFM control mode.

The output voltage control signal Vcont is connected to the positive input terminal of the error amplifier Amp1. A feedback signal Vfb obtained by dividing the output voltage signal Vout by the resistance R2 and the resistance R3 is connected to the negative input terminal of the error amplifier Amp1. The error amplifier Amp1 constitutes an integration circuit using the resistance R1 for phase compensation and the capacitor C1 for phase compensation. An error amplifier output signal Verr from the error amplifier Amp1 is inputted to the negative input terminal of the comparator Cmp1 and to the input terminal of the oscillator circuit OSC1. A triangular wave signal Vosc1 is outputted from the oscillator circuit OSC1 to the positive input terminal of the comparator Cmp1.

The pulse-width-modulation signal Vcmp is fed from the comparator Cmp1 to the one-shot circuit One-shot and the "1" input terminals of the multi-plexer circuits Mux1 and Mux2. The output from the one-shot circuit One-shot is connected to the "0" input terminal of the multi-plexer circuit Mux1. The "0" input terminal of the multi-plexer circuit Mux2 is grounded. The output terminal "OUT" of the multi-plexer circuit Mux1 is connected to the gate of the p-channel transistor P1 via the driver circuit Dr1. The output terminal "OUT" of the multi-plexer circuit Mux2 is connected to the gate of the n-channel transistor N1 via the driver circuit Dr2. The selection signal PWM/PFM from the PWM/PFM selection circuit 10 is fed to the control input terminals "s" of the multi-plexer circuits Mux1 and Mux2.

The source of the p-channel transistor P1 is connected to the input power supply voltage Vin, and the drain of the p-channel transistor P1 is connected to the choke coil L. The gate of the p-channel transistor P1 is driven by the driver circuit Dr1. The n-channel transistor N1 is connected to the ground potential GND and the choke coil L. The gate of the n-channel transistor N1 is driven by the driver circuit Dr2. The output voltage signal Vout converted to a DC voltage by the choke coil L and the smoothing capacitor Cout is fed to the load LOAD. The feedback signal Vfb is formed by dividing the output voltage signal Vout with the resistance R2 and the resistance R3.

The error amplifier output signal Verr from the error amplifier Amp1 and the selection signal PWM/PFM from the PWM/PFM selection circuit 10 are inputted to the oscillator circuit OSC1. The oscillator circuit OSC1 changes the oscillation mode thereof corresponding to the "High" and the "Low" of the selection signal PWM/PFM. The signal inputted to the driver circuit Dr1 is changed over to the pulse-width-modulation signal Vcmp or to the output of the one-shot circuit One-shot corresponding to the "High" or the "Low" of the selection signal PWM/PFM. The signal inputted to the driver circuit Dr2 is changed over to the pulse-width-modulation signal Vcmp or to the ground potential GND corresponding to the "High" or the "Low" of the selection signal PWM/PFM.

The DC—DC converter according to the first embodiment of the invention is configured such that the PWM control mode, that is the first feedback control mode, or the PFM control mode, that is the second feedback control mode, is selected. The DC—DC converter selects the PFM control mode in the range, in which the load current to the load LOAD is lower than a predetermined value, and the PWM control mode irrespective of the magnitude of the load current while the voltage level fed to the load LOAD is changing. Since the operations of the circuit for the PWM control mode and the operations of the circuit for the PFM control mode are different from each other, it is necessary for the DC—DC converter to be provided with a selection signal PWM/PFM. Therefore, the DC—DC converter changes the operation modes of the oscillator circuit OSC1 and the inputs to the multi-plexer circuits Mux1 and Mux2 according to the selection signal PWM/PFM generated at the PWM/PFM selection circuit 10.

The selection signal PWM/PFM is set to be "High" for the PWM control mode. In FIG. 1, the multi-plexer circuits Mux1 and Mux2 have the same circuit configuration.

Figure 2:
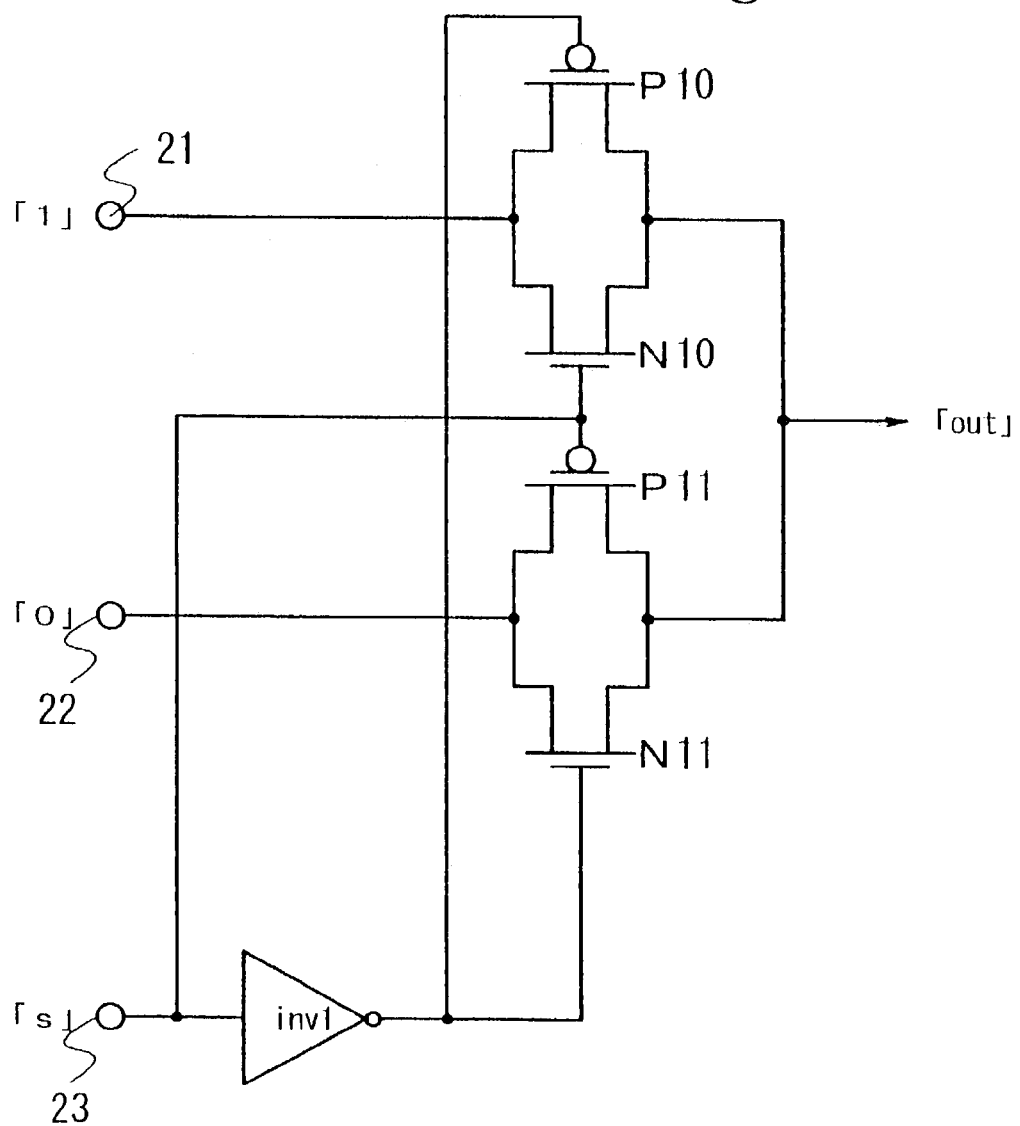
FIG. 2 is a circuit diagram of a multi-plexer circuit in the DC—DC converter shown in FIG. 1.

FIG. 2 is a circuit diagram of a multi-plexer circuit in the DC—DC converter according to the first embodiment of the invention. As shown in FIG. 2, a first input signal "1" is inputted to an input terminal 21, and a second input signal "0" to an input terminal 22. In FIG. 2, p-channel transistors (MOSFET's) P10 and P11 and n-channel transistors (MOSFET's) N10 and N11 are shown. The p-channel transistors P10, P11 and n-channel transistors N10, N11 constitute two sets of analog switches. An input terminal 23 is connected to the gates of the n-channel transistor N10 and the p-channel transistor P11. A setting signal "s" is fed to the gates of the n-channel transistor N10 and the p-channel transistor P11. The input terminal 23 is connected also to the gates of the n-channel transistor N11 and the p-channel transistor P10 via an inverter circuit inv1.

In the multi-plexer circuit shown in FIG. 2, the n-channel transistor N10 and the p-channel transistor P10 are connected when the setting signal "s" fed to the input terminal 23 is "High". The first input signal "1" fed to the input terminal 21 is outputted from the multi-plexer circuit as an output signal "out". During this period, the second input signal "0" to the input terminal 22 is interrupted due to the OFF of the n-channel transistor N11 and the p-channel transistor P11. When the setting signal "s" is "Low", the second input signal "0" to the input terminal 22 is outputted as an output signal "out".

Figure 3:
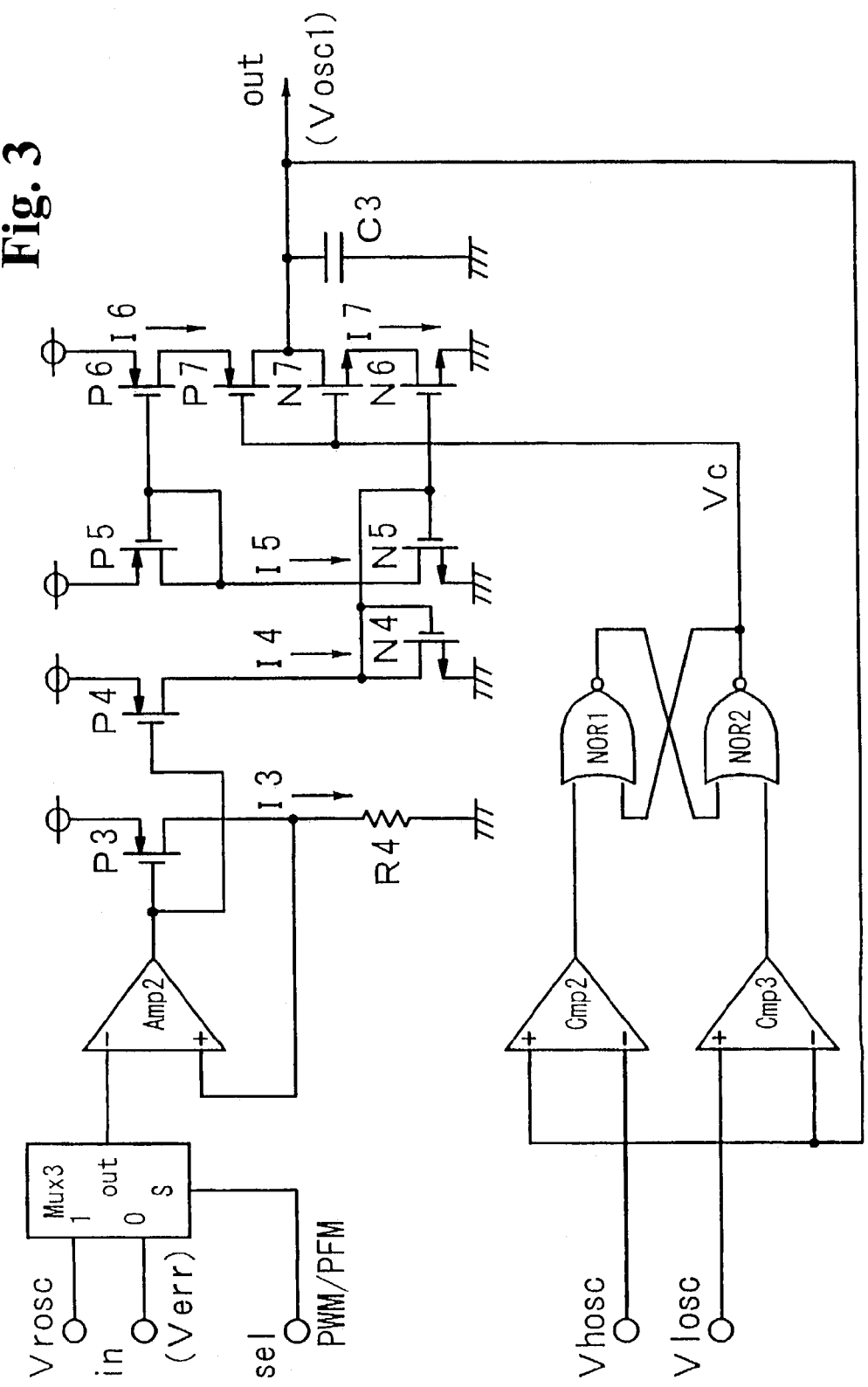
FIG. 3 is a circuit diagram of an oscillator circuit in the DC—DC converter shown in FIG. 1.

FIG. 3 is a circuit diagram of the oscillator circuit in the DC—DC converter according to the first embodiment of the invention. The oscillator circuit OSC1 includes an operational amplifier Amp2, a multi-plexer circuit Mux3, comparators Cmp2 and Cmp3, p-channel transistors (MOSFET's) P3 through P7, n-channel transistors (MOSFET's) N4 through N7, a resistance R4, NOR gates NOR1 and NOR2, and a capacitor C3.

In FIG. 3, an internal reference voltage Vrosc or the error amplifier output signal Verr from the input terminal "in" of the multi-plexer circuit Mux3 is applied to the negative input terminal of the operational amplifier Amp2 corresponding to the input voltage signal sent to the select terminal S. The multi-plexer circuit Mux3 has functions same as those of the multi-plexer circuits Mux1 and Mux2 shown in FIG. 2. The multi-plexer circuit Mux3 outputs the internal reference voltage Vrosc when the selection signal PWM/PFM fed from the select terminal S is indicating the PWM mode, and outputs the error amplifier output signal Verr when the selection signal PWM/PFM is indicating the PFM mode.

With the configuration of the operational amplifier Amp2, the p-channel transistor P3, and the resistance R4, the current I3 flowing through the resistance R4 becomes Vrosc/R4 in the PWM mode, and becomes Verr/R4 in the PFM mode. The inputs to the gates of the p-channel transistors P4 and P3 are common, and the voltages between the gates and the sources thereof are the same. Therefore, the drain current I4 of the p-channel transistor P4 is equal to a product of the current I3 flowing through the resistance R4 and ratios of a gate width and a gate length of the p-channel transistor P4 and the p-channel transistor P3. This relation holds in the similar manner for the currents I5, I6 and I7 flowing through the other transistors.

The gates of the p-channel transistor P7 and the n-channel transistor N7 are connected to the NOR gate NOR2 constituting an RS flip-flop, and an output signal Vc is fed from the NOR gate NOR2 to the gates of the p-channel transistor P7 and the n-channel transistor N7. Since the n-channel transistor N7 is ON and the p-channel transistor P7 is OFF when the output signal Vc from the RS flip-flop is "High", the current I7 is discharged from the capacitor C3 via the n-channel transistors N7 and N6. Since the n-channel transistor N7 is OFF and the p-channel transistor P7 is ON when the output signal Vc from the RS flip-flop is "Low", the current I6 is charged to the capacitor C3 via the p-channel transistors P6 and P7.

The potential of the triangular wave signal Vosc1 outputted as a charging-up voltage of the capacitor C3 is monitored by the comparators Cmp2 and Cmp3, to which internal reference voltages Vhosc and Vlosc having a relation of Vhosc>Vlosc are inputted respectively. The potential of the triangular wave signal Vosc1 rises when the output signal Vc from the RS flip-flop is "Low". Since the output of the comparator Cmp2 becomes "High" as soon as the rising potential of the triangular wave signal Vosc1 exceeds the internal reference voltage Vhosc, the output signal Vc of the RS flip-flop changes to "High". As soon as the potential of the triangular wave signal Vosc1 falls below the internal reference voltage Vlosc afterward, the output of the comparator Cmp3 becomes "High" and the output signal Vc from the RS flip-flop returns to "Low".

Figure 4:
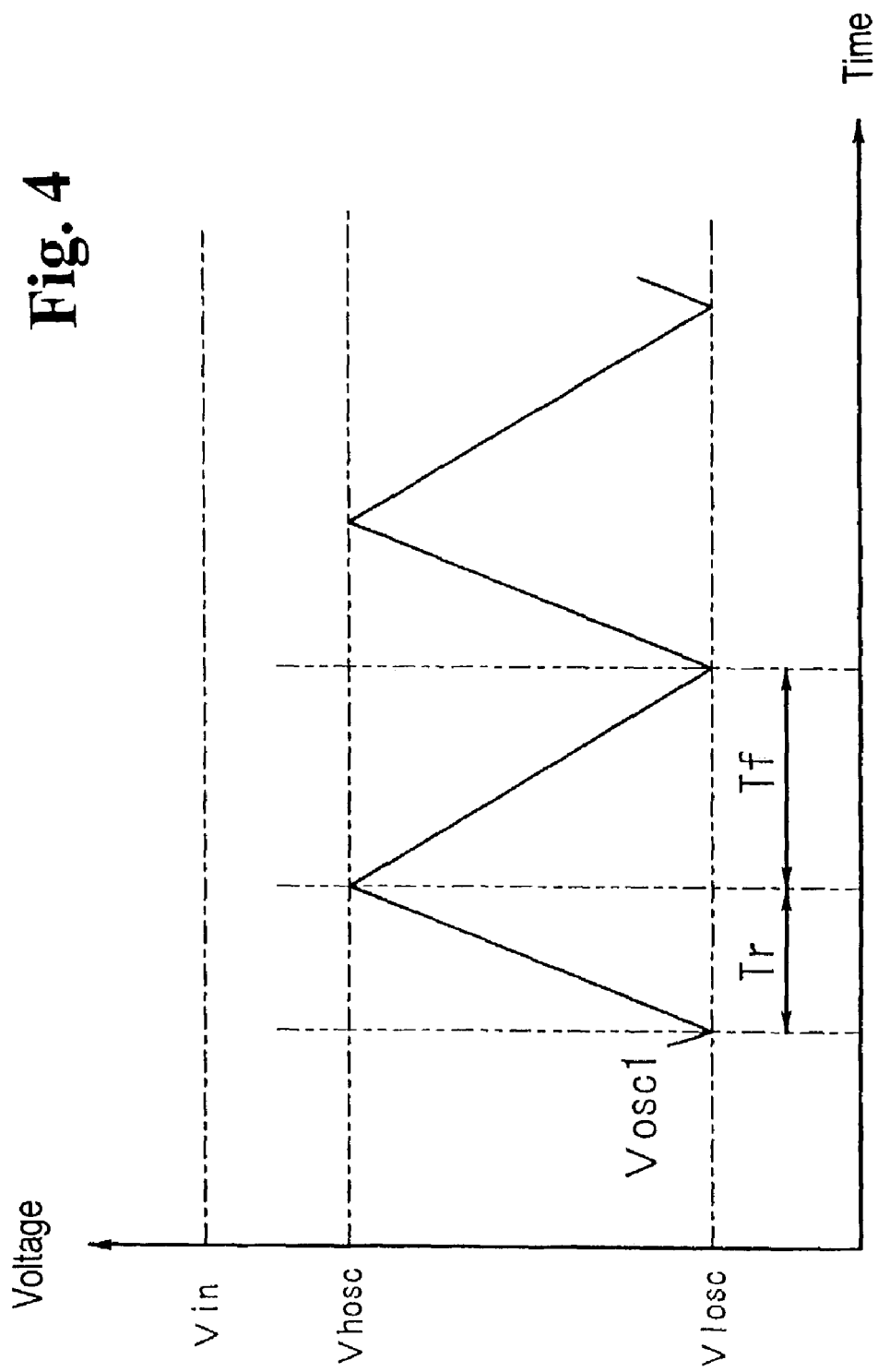
FIG. 4 is a chart showing a waveform of a triangular wave signal outputted from the oscillator circuit shown in FIG. 3.

FIG. 4 is a chart showing a waveform of a triangular wave signal outputted from the oscillator circuit shown in FIG. 3. The period Tr, for which the potential of the triangular wave signal Vosc1 rises, is expressed by the following equation where the triangular wave signal Vosc1 has the lower limit Vlosc and the upper limit Vhosc.

$$Tr = C3 \times (Vhosc - Vlosc)/I6$$

Similarly, the period Tf, for which the potential of the triangular wave signal Vosc1 falls, is expressed by the following relational expression.

$$Tf = C3 \times (Vhosc - Vlosc)/I7$$

The currents I6 and I7 are proportional to the current I3. Therefore, the oscillation frequency fosc of the triangular wave signal Vosc1 can be adjusted by changing the resistance R4, the internal reference voltage Vrosc or the voltage of the error amplifier output signal Verr applied to the input terminal "in" of the multi-plexer circuit Mux3.

Figure 5:
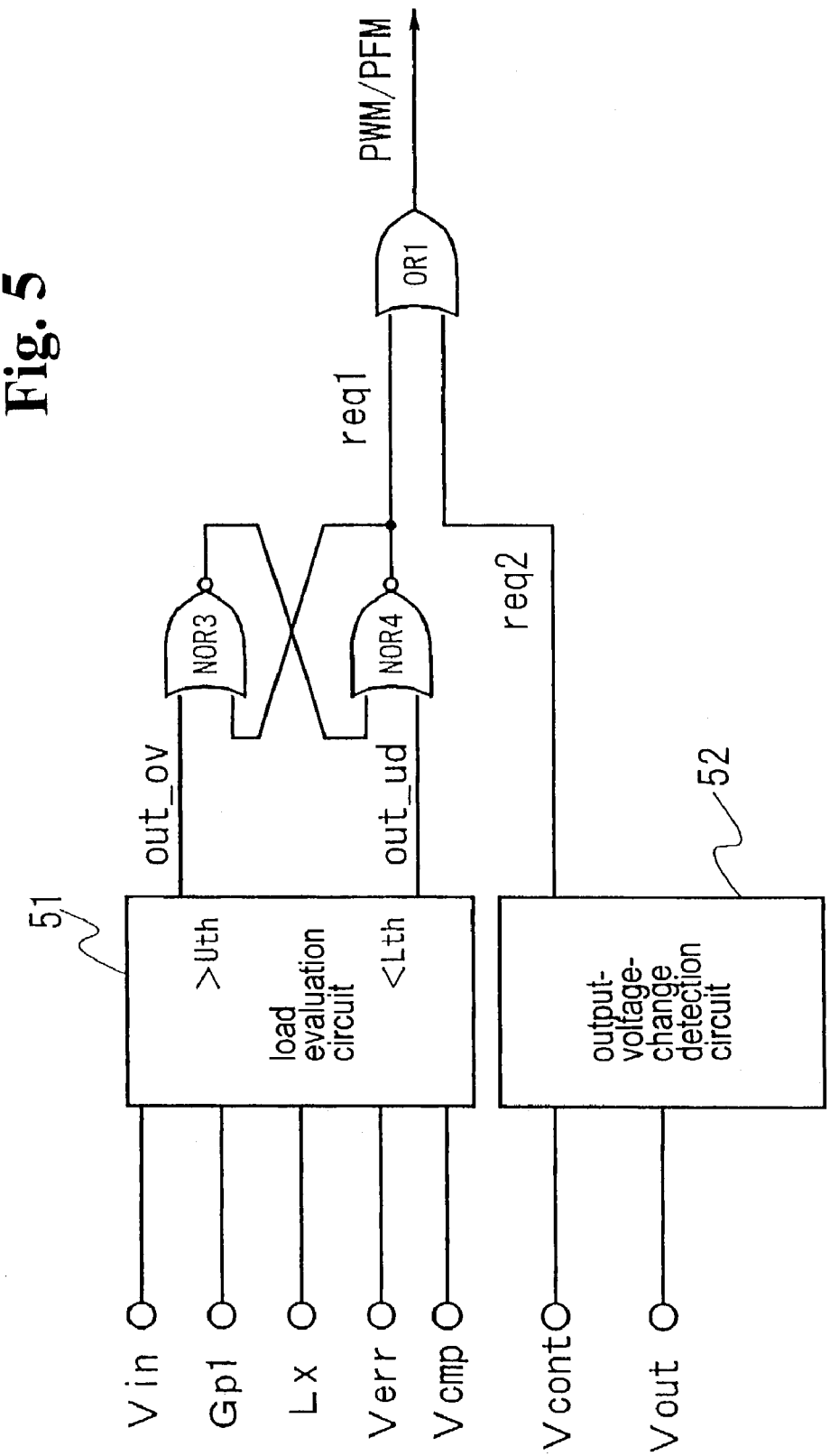
FIG. 5 is a block circuit diagram of a PWM/PFM selection circuit in the DC—DC converter shown in FIG. 1.

FIG. 5 is a block circuit diagram of a PWM/PFM selection circuit in the DC—DC converter shown in FIG. 1 according to the first embodiment of the invention. The PWM/PFM selection circuit 10 selects the PWM control mode or the PFM control mode for the control method of the DC—DC converter. For the selection, it is necessary to determine the magnitude of the load LOAD connected to the DC—DC converter and whether it is required to change the output voltage signal Vout. The PWM/PFM selection circuit 10 includes a load evaluation circuit 51, an output-voltage-change detection circuit 52, NOR gates NOR3 and NOR4, and an OR gate OR1.

The load evaluation circuit 51 receives the input power supply voltage Vin, a gate signal Gp1 outputted from the driver circuit Dr1, a voltage signal Lx, the error amplifier output voltage Verr and the pulse-width-modulation signal Vcmp. The load evaluation circuit 51 outputs two pulse signals out_ov and out_ud based on threshold values Uth and Lth. The threshold value Uth is a reference for evaluating the magnitude of the load upon switching from the PFM control mode to the PWM control mode. The threshold value Lth is a reference for evaluating the magnitude of the load upon switching from the PWM control mode to the PFM control mode. To secure stable operations of the load evaluation circuit 51, the threshold values Uth and Lth are in a hysteretic relation such as Uth>Lth. As soon as the load LOAD exceeds the threshold value Uth, the pulse signal out_ov becomes "High", and an RS flip-flop including the NOR gates MOR3 and NOR4 maintains a load evaluation signal req1 at "High". As soon as the load LOAD becomes below the threshold value Lth, the pulse signal out_ud becomes "High", and the load evaluation signal req1 is maintained at "Low."

The output voltage control signal Vcont and the output voltage signal Vout are fed to the output-voltage-change detection circuit 52. The output-voltage-change detection circuit 52 holds a detection signal req2 at "High" from the time, at which the output voltage control signal Vcont starts changing, until the time, at which the output voltage control signal Vcont stops changing. The load evaluation signal req1 and the detection signal req2 are inputted to the OR gate OR1, which generates a logical OR signal. The logical OR signal is outputted as a selection signal PWM/PFM. When the PWM control mode is required due to a change in the load conditions or the output voltage, the selection signal PWM/PFM becomes "High".

FIG. 6 is a table showing a relationship between a PWM/PFM selection signal and load and voltage variations in the PWM/PFM selection circuit 10. Only when the PWM/PFM selection circuit 10 determines that the load LOAD is light and there is no change in the output voltage signal Vout, the PWM/PFM selection circuit 10 sets the selection signal PWM/PFM at "Low" and selects the PFM control mode for the control mode of the DC—DC converter.

Figure 7:
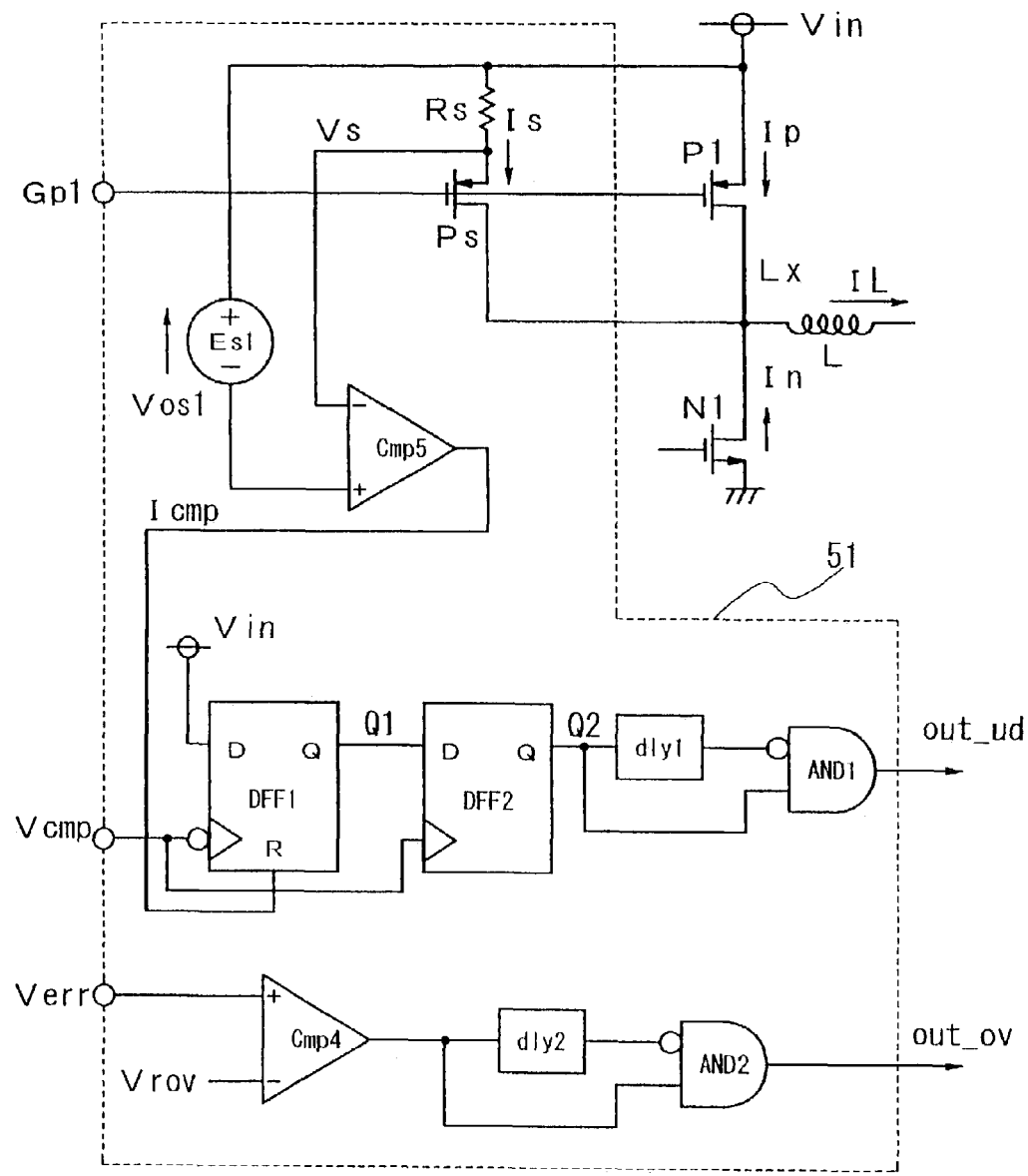
FIG. 7 is a circuit diagram of a load evaluation circuit in the PWM/PFM selection circuit shown in FIG. 5.

FIG. 7 is a circuit diagram of a load evaluation circuit 51 in the PWM/PFM selection circuit shown in FIG. 5. The load evaluation circuit 51 evaluates the magnitude of the load LOAD by a current Ip flowing through the p-channel transistor P1 for outputting. To measure the current Ip, a p-channel transistor Ps for sensing is disposed. The input to the gate of the p-channel transistor Ps is common with the input to the gate of the p-channel transistor P1. The drain of the p-channel transistor Ps is common with the drain of the p-channel transistor P1. The source of the p-channel transistor Ps is connected to the input power supply voltage Vin via a resistance Rs for current sensing.

When the current Ip flows through the p-channel transistor P1, a current Is flows through the p-channel transistor Ps. By setting a voltage drop at the sensing resistance Rs to be much smaller than a voltage between the gate and the source of the p-channel transistor Ps, the current Is is proportional to the current Ip. The source voltage Vs changed by the current Is is fed to the negative input terminal of a comparator Cmp5. An internal power supply Es1 is inserted between the input power supply voltage Vin and the positive input terminal of the comparator Cmp5. As a result, the source voltage Vs is compared with an internal reference voltage (Vin−Vos1). Hereinafter, the output voltage of the comparator Cmp5 is referred to as Icmp.

The output voltage Icmp is inputted to the reset terminal R of a D flip-flop DFF1. The D flip-flop DFF1 is constructed such that the D flip-flop DFF1 takes "High" at a jump of the pulse-width-modulation signal Vcmp sent from the comparator Cmp1 for pulse width modulation. The output Q1 of the D flip-flop DFF1 is taken, at the jump of the pulse-width-modulation signal Vcmp, into a D flip-flop DFF2 positioned in the back stage of the D flip-flop DFF1. An AND gate AND1 generates a logical AND signal of the output Q2 from the D flip-flop DFF2 and an inversion of the signal obtained by delaying the output Q2 through a delay circuit dly1. The AND gate AND1 outputs the logical AND signal as the pulse signal out_ud.

A comparator Cmp4 compares the error amplifier output signal Verr with the internal reference voltage Vros. A delay circuit dly2 and an AND gate AND2 are connected to the comparator Cmp4. The AND gate AND2 generates a logical AND signal of the output of the comparator Cmp4 and the signal obtained by delaying the output of the comparator Cmp4 through the delay circuit dly2. The AND gate AND2 outputs the logical AND signal as the pulse signal out_ov.

An operation of the load evaluation circuit 51 will be described next. FIGS. 8(a) to 8(h) are charts showing waveforms representing an operation of each unit in the load evaluation circuit 51 shown in FIG. 7. The waveforms in FIGS. 8(a)–8(g) describe the operations of the load evaluation circuit 51 in shifting from the PWM control mode to the PFM control mode due to the decreasing load current.

Figure 8A:
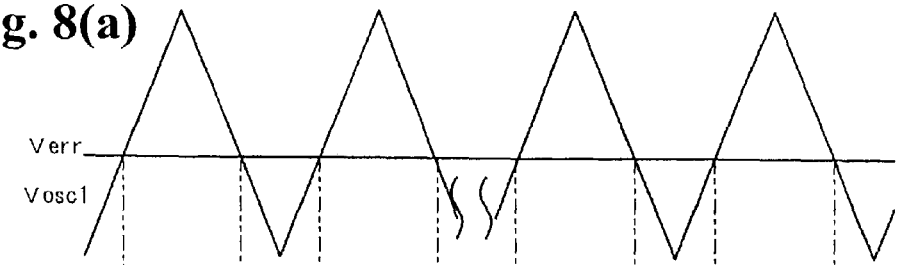
FIGS. 8(a) to 8(h) are charts showing waveforms representing an operation of each unit in the load evaluation circuit shown in FIG. 7.

FIG. 8(a) shows a waveform of a change in the error amplifier output signal Verr and the triangular wave signal Voscl. The n-channel transistor N1 in the output stage is ON when Voscl>Verr, and the p-channel transistor P1 is ON when Voscl<Verr.

Figure 8B:
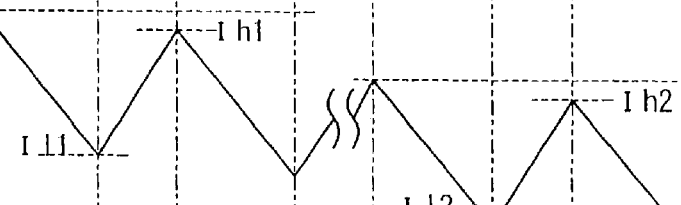

FIG. 8(b) shows a waveform of a change in the coil current IL flowing through the choke coil L. The coil current IL increases while the p-channel transistor P1 is ON and decreases while the n-channel transistor N1 is ON. The waveform on the left hand side is obtained when the load current is high and the waveform on the right hand side is obtained when the load current is low. In both occasions, the load current is decreasing with elapse of time.

Figure 8C:
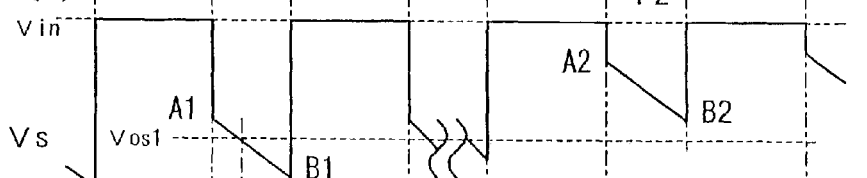

FIG. 8(c) shows a waveform of a change in the source voltage Vs at the connection point of the source of the p-channel transistor Ps and the resistance Rs for current sensing. The source voltage Vs is proportional to the current Ip flowing through the p-channel transistor P1. Since any current is not generated in the current sensing resistance Rs while the n-channel transistor N1 is ON, the source voltage Vs is kept at the input power supply voltage Vin. As the current Ip increases after the p-channel transistor P1 is switched on, the source current Is also increases and the source voltage Vs falls.

Figure 8D:
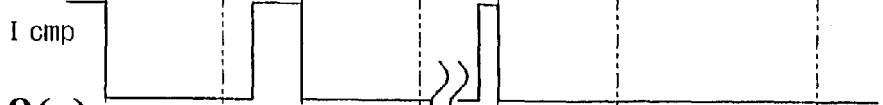
Figure 8E:
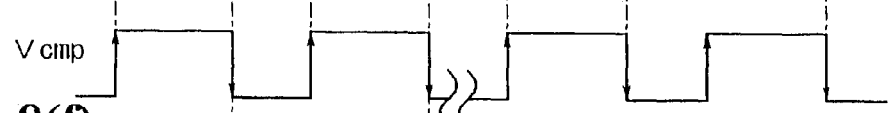
Figure 8F:
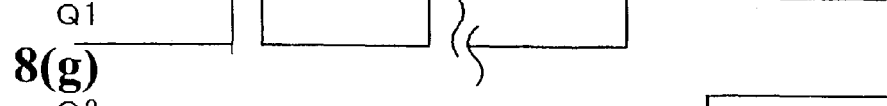
Figure 8G:
Figure 8H:

FIG. 8(d) shows a waveform of a change in the output voltage Icmp of the comparator Cmp5. As the waveforms in FIG. 8(b) through 8(d) show, the source voltage Vs falls from A1 to B1 during the period T1, for which the coil current IL flowing through the choke coil L increases from Il1 to Ih1. The source voltage Vs falls from A2 to B2 during the period T2, for which the coil current IL flowing through the choke coil L increases from Il2 to Ih2.

The source voltage Vs is compared with the internal reference voltage (Vin−Vos1). When the source voltage Vs is lower than the internal reference voltage, the output voltage Icmp becomes "High". In other words, the output voltage Icmp becomes "High" as soon as the source voltage Vs exceeds the internal reference voltage Vos1 during the period T1, for which the source voltage Vs falls from A1 to B1. Since the source voltage Vs does not exceed the internal reference voltage Vos1 during the period T2, for which the source voltage Vs falls from A2 to B2, the output voltage Icmp remains "Low".

FIGS. 8(e), 8(f), 8(g), and 8(h) show waveforms of the pulse-width-modulation signal Vcmp, the output Q1 of the D flip-flop DFF1, the output Q2 of the D flip-flop DFF2, and the pulse signal out_ud, respectively. The D flip-flop DFF1 takes "High" at a drop of each pulse of the pulse-width-modulation signal Vcmp. Since the D flip-flop DFF1 is reset by the high level of the output voltage Icmp, the D flip-flop DFF1 keeps the output Q1 thereof at "High" when the output voltage Icmp is not "High" any more. The D flip-flop DFF2 takes the output Q1 of the D flip-flop DFF1 at a jump of the pulse-width-modulation signal Vcmp and outputs the output Q1 as the output. Q2. The pulse signal out_ud is outputted at the jump of the output Q2.

While the load current is decreasing with elapse of time, the pulse signal out_ud is outputted when the peak value of the current Ip flowing through the p-channel transistor P1 is lower than the predetermined level Lth.

When the load current increases, the pulse signal out_ov switches from the PFM control mode to the PWM control mode. As the load LOAD becomes heavier under the PFM control mode, a feedback control is operated so that the error amplifier output signal Verr increases to increase the switching frequency. As the load evaluation circuit 51 in FIG. 7 indicates, the output of the comparator Cmp4 changes to "High" when the voltage of the error amplifier output signal Verr becomes high enough to exceed the internal reference voltage Vrov. When the output of the comparator Cmp4 is changed to "High", the pulse signal out_ov is outputted by the delay circuit dly2 and the AND gate AND2 receiving the output of the comparator Cmp4.

In the case in which the load current is increasing with elapse of time, the pulse signal out_ov is outputted when the peak value of the current Ip flowing through the p-channel transistor P1 exceeds the predetermined level Uth. The threshold values Uth and Lth for outputting the pulse signals are set to be Uth>Lth such that the selection signal PWM/PFM exhibits certain hysteresis characteristics.

FIG. 9 is a block circuit diagram of an output-voltage-change detection circuit in the PWM/PFM selection circuit shown in FIG. 5. The output-voltage-change detection circuit 52 includes differentiation circuits 91 and 93, squaring circuits 92 and 94, and a D flip-flop DFF3 having a set terminal.

The output voltage control signal Vcont is fed to the differentiation circuit 91. The differential output S1 from the differentiation circuit 91 is converted to an absolute signal S2 by the squaring circuit 92. The output voltage signal Vout is fed to the differentiation circuit 93. The differential output S3 from the differentiation circuit 93 is converted to an absolute signal S4 by the squaring circuit 94. The squaring circuits 92 and 94 are connected, respectively, to the set terminal s and the clock terminal of the D flip-flop DFF3. A detection signal req2 is outputted as the Q signal of the D flip-flop DFF3 corresponding to a change in the output voltage and based on the absolute signals S2 and S4.

FIGS. 10(a)–10(g) are charts showing waveforms representing an operation of each unit in the output-voltage-change detection circuit shown. By obtaining the absolute value of the differential output S1 of the output voltage control signal Vcont, the absolute value signal S2 having the waveform shown in FIG. 10(d), which becomes high when the output voltage control signal Vcont changes, is obtained. In the same way as described above, the absolute value signal S4 having the waveform shown in FIG. 10(f), which becomes high while the output voltage signal Vout changes, is obtained. The D flip-flop DFF3 maintains the detection signal req2 at "High" immediately after the output voltage control signal Vcont is changed until when the changing output voltage signal Vout becomes stable.

Figure 11:
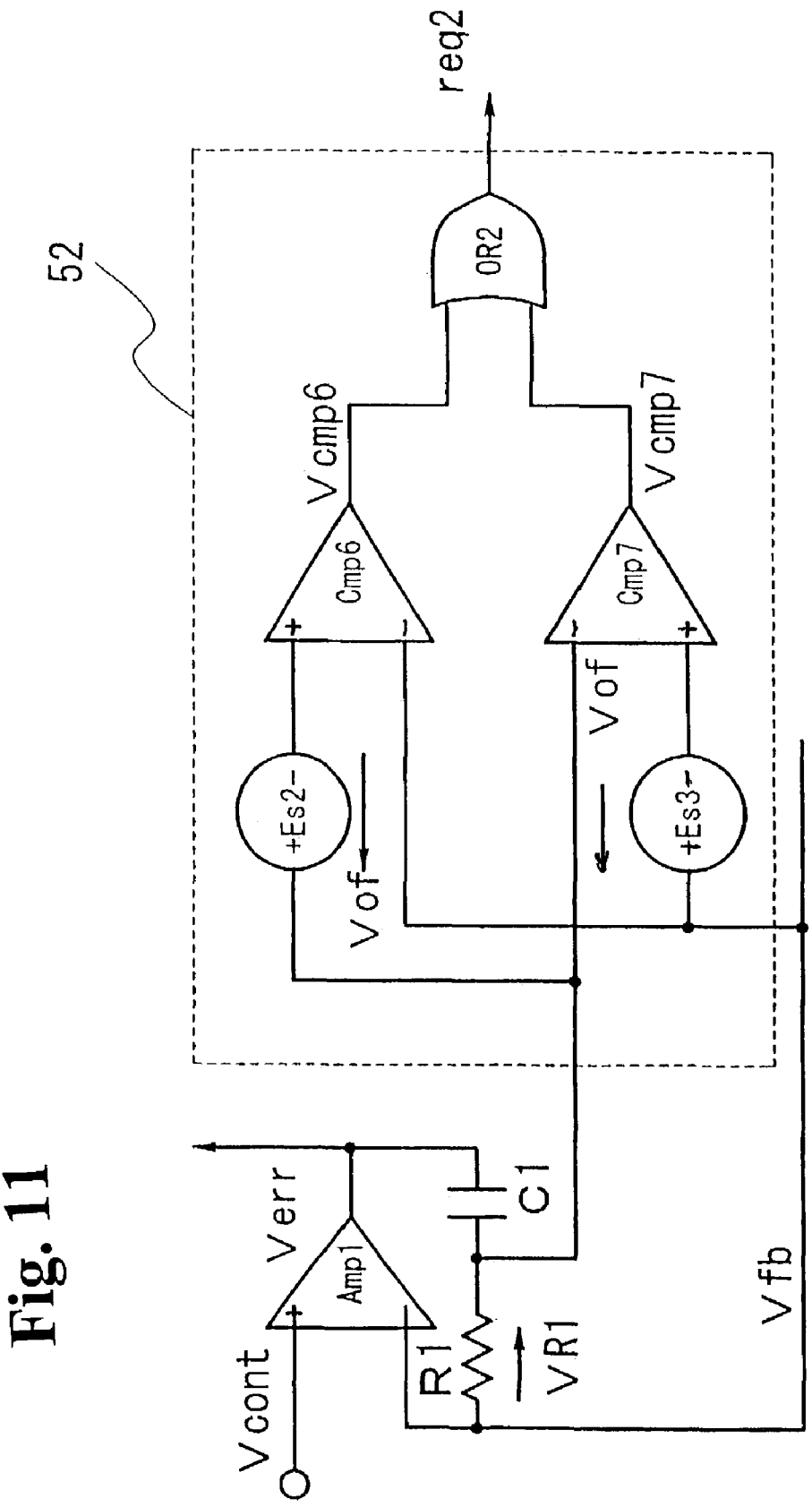
FIG. 11 is a block circuit diagram of another output-voltage-change detection circuit.
Figure 15A:
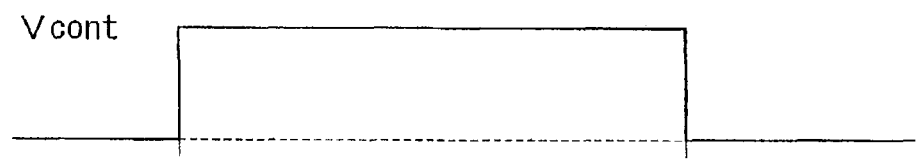
FIGS. 15(a) to 15(d) are charts showing waveforms representing changes in output voltages in the DC—DC converter shown in FIG. 1 under a light load condition.
Figure 15B:
Figure 15C:
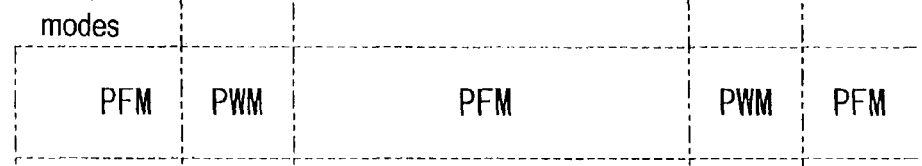
Figure 15D:
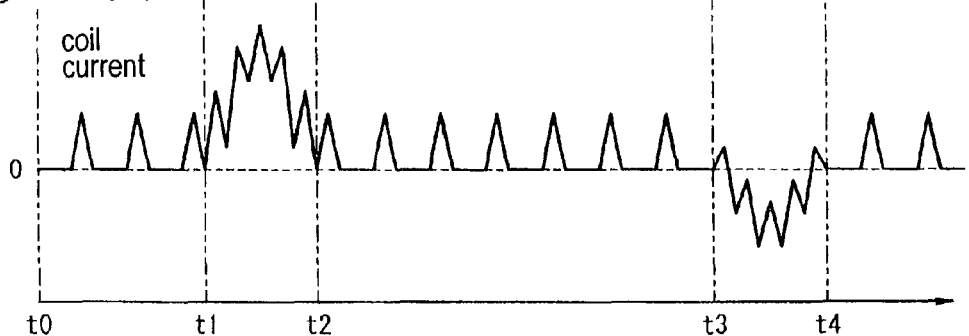

FIG. 11 is a block circuit diagram of another output-voltage-change detection circuit. In FIG. 11, the output-voltage-change detection circuit 52 includes voltage supplies Es2 and Es3, comparators Cmp6 and Cmp7, and an OR gate OR2. The error amplifier Amp1, the phase compensation resistance R1, and the phase compensation capacitor C1 are included in the amplifying means constituting the DC—DC converter in FIG. 1. The amplifying means amplifies the voltage difference between the output voltage control signal Vcont used for a reference voltage and the feedback signal that changes corresponding to the level of the voltage fed to the load LOAD.

The voltage VR1 between terminals of the phase compensation resistance R1 is added to an offset voltage −Vof, and is supplied to the positive input terminal of the comparator Cmp6 via the voltage supply Es2. The voltage VR1 is supplied, as it is, to the negative input terminal of the comparator Cmp7. The feedback signal Vfb is added to the offset voltage −Vof, and is supplied to the plus input terminal of the comparator Cmp7 via the voltage supply Es3. The feedback signal Vfb is supplied, as it is, to the negative input terminal of the comparator Cmp6.

Output signals Vcmp6 and Vcmp7 from the comparators Cmp6 and Cmp7 are inputted to the OR gate OR2 to generate the detection signal req2 as the output of the output-voltage-change detection circuit 52.

An operation of the output-voltage-change detection circuit 52 will be described next. FIGS. 12(a)–12(g) are charts showing waveforms representing an operation of each unit in the output-voltage-change detection circuit shown in FIG. 11. As shown in FIG. 12(a), when the output voltage control signal Vcont rises at the time t1, the output voltage signal Vout increases as shown in FIG. 12(b). Since the error amplifier output signal Verr increases due to the error amplifier Amp1, a current flows in the phase compensation capacitor C1 as shown in FIG. 12(c). With the current, the voltage drop VR1 is generated in the phase compensation resistance R1.

When the output voltage signal Vout becomes stable at the time t2, the error amplifier output signal Verr becomes stable, and the current stops flowing to the phase compensation capacitor C1. As a result, the voltage drop VR1 in the phase compensation resistance R1 becomes zero, as shown in FIG. 12(d) The comparator Cmp6 generates the output signal Vcmp6 only when the voltage drop VR1 is higher than the offset voltage Vof as shown in FIG. 12(e).

When the output voltage control signal Vcont drops at the time t3, the output voltage signal Vout decreases as shown in FIG. 12(b). Since the error amplifier output signal Verr decreases due to the error amplifier Amp1, a current flows to the phase compensation capacitor C1 in the opposite direction as shown in FIG. 12(d). With the current, the voltage drop VR1 is generated in the phase compensation resistance R1.

When the output voltage signal Vout becomes stable at the time t4, the error amplifier output signal Verr keeps a certain value, and the current stops flowing to the phase compensation capacitor C1. As a result, the voltage drop VR1 in the phase compensation resistance R1 becomes zero as shown in FIG. 12(d). The comparator Cmp7 generates a rectangular voltage wave in the output signal Vcmp7 while the voltage drop −VR1 is higher than the offset voltage Vof as shown in FIG. 12(f).

As shown in FIG. 12(g), when the output voltage signal Vout changes, the detection signal req2 outputted from the OR gate OR2 becomes "High" as a detection signal of the output voltage changes based on the output signals Vcmp6 and Vcmp7 outputted from the comparators Cmp6 and Cmp7.

As described above, in the output-voltage-change detection circuit 52 shown in FIG. 11, it is possible to detect the change in the voltage fed to the load LOAD based on the balance between the error amplifier output signal Verr outputted from the error amplifier Amp1 as an amplifying means and the feedback signal Vfb fed back to the error amplifier Amp1. In other words, it is determined that the output voltage signal Vout is constant and the error amplifier output signal Verr and the feedback signal Vfb are balanced when no current flows through the phase compensation resistance R1 disposed between the input and output terminals of the error amplifier Amp1 that regulates the output voltage. In contrast, it is determined that the output voltage signal Vout changes without the balance when the current is flowing through the phase compensation resistance R1.

FIGS. 13(a)–13(e) are charts showing waveforms representing an operation of each unit in the output-voltage-change detection circuit when the load current changes rapidly. In this case, the output voltage control signal Vcont is constant, and the load current Iout drops rapidly at the time t1 and, then, jumps rapidly at the time t3. The detection signal req2 outputted from the OR gate OR2 becomes "High" when the change in the load current exceeds a certain level corresponding to the offset voltage Vof. Thus, the feedback control mode of the DC—DC converter is changed from the PFM mode to the PWM mode.

An operation of the DC—DC converter shown in FIG. 1 will be described next. When the selection signal PWM/PFM is "High", the oscillator circuit OSC1 outputs the triangular wave signal Vosc1 having a certain frequency. The multi-plexer circuits Mux1 and Mux2 feed the output of the pulse-width-modulation comparator Cmp1 to the driver circuits Dr1 and Dr2, respectively. Therefore, the DC—DC converter performs a control mode same as the PWM mode when the selection signal PWM/PFM is "High".

When the selection signal PWM/PFM is "Low", the oscillator circuit OSC1 outputs the triangular wave signal Vosc1 having an oscillation frequency corresponding to the error amplifier output signal Verr. The output of the one-shot circuit One-shot, to which the output of the pulse-width-modulation comparator Cmp1 is inputted for the trigger, is used for the gate signal of the p-channel transistor P1. The gate signal of the n-channel transistor N1 is fixed at the ground potential. The n-channel transistor N1 is always in the OFF-state. The substrate diode D2 of the n-channel transistor N1 is provided as a current path between the ground potential GND and the choke coil L. In this case, the configuration of the DC—DC converter is the same as that of the conventional DC—DC converter conducting the conventional PFM control mode. Therefore, the DC—DC converter according to the first embodiment of the invention conducts the PFM control mode same as that of the conventional DC—DC converter.

When there is no change in the output voltage signal Vout and the detection signal req2 is "Low", the selection signal PWM/PFM is "High" in the heavy load condition (req1="High"), and the DC—DC converter conducts the PWM control mode. In the light load condition (req1="Low"), the DC—DC converter shifts to the PFM control mode. Therefore, the switching loss of the DC—DC converter is reduced and a high efficiency is obtained in a wide load range.

When the output voltage signal Vout changes and the determination signal req2 is "High", in the heavy load condition (req1="High"), the DC—DC converter continues the PWM control mode irrespective of the change in the output voltage signal Vout. Therefore, it is possible to perform the control mode while following the change in the output voltage signal Vout in a short period of time.

FIGS. 14(a)–14(e) are charts showing waveforms representing changes in the output voltage signals in the FWM control mode. In this case, the output voltage control signal Vcont jumps at the time t1 and drops at the time t3. In accordance with the change in the output voltage control signal Vcont, the output voltage signal Vout increases from the potential Vout1 to the potential Vout2 for a period of time Tr2, and decreases from the potential Vout2 to the potential Vout1 for a period of time Tf2. The current in the smoothing capacitor Cout is a sum of a current for changing the charge in the smoothing capacitor Cout due to the change in the output voltage signal Vout and the load current. For the sake of the explanation, it is assumed that the load current is constant irrespective of the value of the output voltage signal Vout. A charging current and a discharging current flow to increase and decrease the charge in the smoothing capacitor Cout.

The charging current value Icrg1 is expressed by the following expression.

$$Icrg1 = Cout \times (Vout2 - Vout1)/Tr2$$

The discharging current value Idis1 is expressed by the following expression.

$$Idis1 = Cout \times (Vout2 - Vout1)/Tf2$$

From the expressions, it is necessary to change the current value fast and greatly to reduce a period of time for the output voltage signal Vout to change.

When the smoothing capacitor Cout is charged and discharged via the transistors (MOSFET's) N1 and P1 in the output stage and the choke coil L, a current waveform becomes a switching current waveform mainly including a sum of the load current and the charging and discharging current necessary to change the potential of the output voltage signal Vout. In the PWM control mode, it is possible to change the current value in a relatively short period of time, since the PWM control mode changes the duty ratio per each switching timing. By increasing the switching frequency, it is possible to change the current value in a short period of time. By flowing a negative current from the smoothing capacitor Cout to the ground potential GND via the n-channel transistor N1, it is possible to drop the output voltage rapidly.

An operation of the DC—DC converter in a case that the detection signal req2 is "High" due to the change in the output voltage signal Vout and the load is light (req1="Low") will be described next. FIGS. 15(a)–15(d) are charts showing waveforms representing changes in the output voltages in the DC—DC converter shown in FIG. 1 in the light load condition. When the output voltage signal does not change at the time t0, the detection signal req2 and the selection signal PWM/PFM are "Low", and the DC—DC converter is conducting the PFM control mode. Therefore, the coil current IL flowing through the choke coil L is discontinuous.

The detection signal req2 and the selection signal PWM/PFM become "High" at the time t1 at which the output voltage control signal Vcont jumps, and the DC—DC converter shits to the PWM control mode. Since the coil current IL flows continuously and the mean value of the current flowing into the smoothing capacitor Cout becomes very high, it is possible to increase the output voltage signal Vout in a short period of time. After the time t2 at which the output voltage signal Vout stops changing, the DC—DC converter returns to the PFM control mode and continues the operation with low power consumption.

When the DC—DC converter shifts to the PWM control mode at the time t3 at which the output voltage control signal Vcont decreases, the coil current IL flows continuously and a part of, or all of the coil current IL is negative. When the coil current IL is negative, the charges in the smoothing capacitor Cout are discharged via the choke coil L.

It is not possible to flow a negative current in the PFM control mode. Thus, it is difficult to decrease the output voltage signal Vout within a period of time shorter than the time constant of the smoothing capacitor and the load current. However, according to the first embodiment of the invention, the DC—DC converter can decrease the output voltage signal Vout within a short period in the PWM control mode. The DC—DC converter resumes the PFM control mode after the time t4 at which the output voltage signal Vout stops changing, and continues the operation with low power consumption.

FIGS. 16(a)–16(d) are charts showing waveforms representing changes in output voltage signals in the DC—DC converter shown in FIG. 1 having the output-voltage-change detection circuit shown in FIG. 11 when the load current changes rapidly. Since the load current Iout is low at the time t0, the detection signal req2 and the selection signal PWM/PFM are "Low", and the DC—DC converter is conducting the PFM control mode. Therefore, the coil current IL flowing through the choke coil L is discontinuous.

The output voltage signal Vout jumps at the time t1 at which the load current Iout decreases sharply. At this instance, the detection signal req2 and the selection signal PWM/PFM become "High" to switch the DC—DC converter to the PWM control mode, and the coil current IL starts flowing continuously. Therefore, the output voltage signal Vout is converged in a shorter period as opposed to the PFM control mode. The DC—DC converter returns to the PFM control mode at the time t2 at which the output voltage signal Vout stops changing, and continues the operation with low power consumption.

The output voltage signal Vout decreases at the time t3 at which the load current Iout starts decreasing sharply. At this time, by shifting to the PWM control mode, the coil current IL flows continuously. Thus, in the DC—DC converter according to the first embodiment, it is possible to converge the output voltage signal Vout in a short period of time even when the load current Iout changes and the output voltage control signal Vcont does not change. The DC—DC converter returns to the PFM control mode at the time t4 at which the output voltage signal Vout stops changing, and continues the operation with low power consumption.

As described above, in the DC—DC converter according to the first embodiment of the invention, it is possible to change the charging current and the discharging current of the output capacitance in a short period of time and shorten the transient period of the output voltage through the PWM control mode irrespective of the load conditions when the output voltage changes. Therefore, it is possible to maintain high conversion efficiency in a wide load range and prevent the response characteristics of the output voltage signal from lowering under the light load condition.

As described above, in the DC—DC converter according to the first embodiment of the invention, it is possible to maintain high conversion efficiency in a wide load range and prevent the response characteristics of the output voltage signal from lowering under the light load condition. However, when the output voltage control signal Vcont changes stepwise, the operating point of the error amplifier Amp1 also changes stepwise. Since the reference value is determined by using the operating point of the error amplifier Amp1 as an initial value, there is a problem of overshooting in the output voltage signal Vout.

Further, in the PWM/PFM selection circuit 10, it is determined that the load is light and there is no change in the output voltage signal Vout. Accordingly, the PWM/PFM signal becomes "Low", or when the PWM/PFM signal becomes "High" again, there is a problem of undershooting or overshooting in the output voltage signal Vout.

Figure 17:
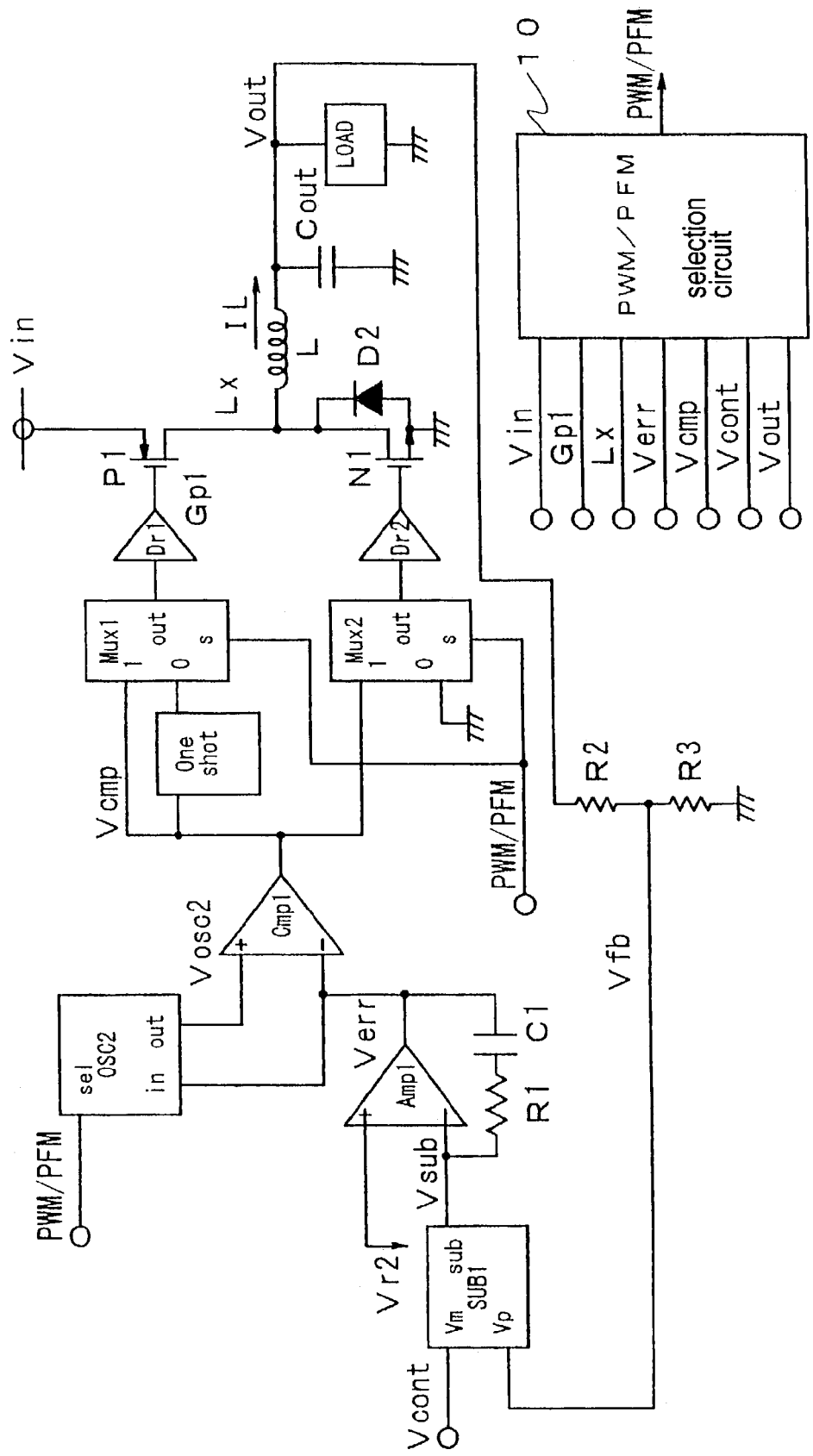
FIG. 17 is a block circuit diagram of a DC—DC converter.

To solve these problems, a DC—DC converter according to the second embodiment of the invention will be described next. FIG. 17 is a block circuit diagram of the DC—DC converter according to the second embodiment of the invention. The DC—DC converter converts an input power supply voltage Vin to a certain voltage level, and feeds the converted voltage to a load LOAD. The DC—DC converter includes an error amplifier Amp1, a capacitor C1 for phase compensation, a resistance R1 for phase compensation, a feedback resistance R2, a feedback resistance R3, an oscillator circuit OSC2, a comparator Cmp1 for pulse width modulation, a one-shot circuit One-shot, multi-plexer circuits Mux1 and Mux2, driver circuits Dr1 and Dr2, a p-channel transistor (MOSFET) P1 for outputting, an n-channel transistor (MOSFET) N1 for outputting, a choke coil L, a diode D2, a smoothing capacitor Cout, a PWM/PFM selection circuit 10, and a subtraction circuit SUB1.

The DC—DC converter according to the second embodiment is different from the DC—DC converter according to the first embodiment in that the oscillator circuit OSC1 in the first embodiment is replaced with the oscillator circuit OSC2 having a structure (described later with reference to FIG. 19).

A feedback signal Vfb is obtained by dividing an output voltage signal Vout fed to a load LOAD by the resistance R1 and the resistance R2. The feedback signal Vfb is connected to the Vp input terminal of the subtraction circuit SUB1. An output voltage control signal Vcont is connected to the Vm input terminal of the subtraction circuit SUB1. The subtraction circuit SUB1 generates a difference signal Vsub indicating the difference between the feedback signal Vfb and the output voltage control signal Vcont.

The error amplifier Amp1 constitutes an integration circuit using the phase compensation resistance R1 and the phase compensation capacitance C1. A reference voltage signal Vr2 is connected to the positive input terminal of the error amplifier Amp1. The difference signal Vsub outputted from the subtraction output terminal of the subtraction circuit SUB1 is connected to the negative input terminal of the error amplifier Amp1.

A configuration of the DC—DC converter according to the second embodiment has components same as those in the first embodiment. Thus, the same reference numerals and symbols in the DC—DC converter according to the first embodiment are used to describe the DC—DC converter according to the second embodiment, and their detailed descriptions are omitted for the sake of simplicity.

Figure 18:
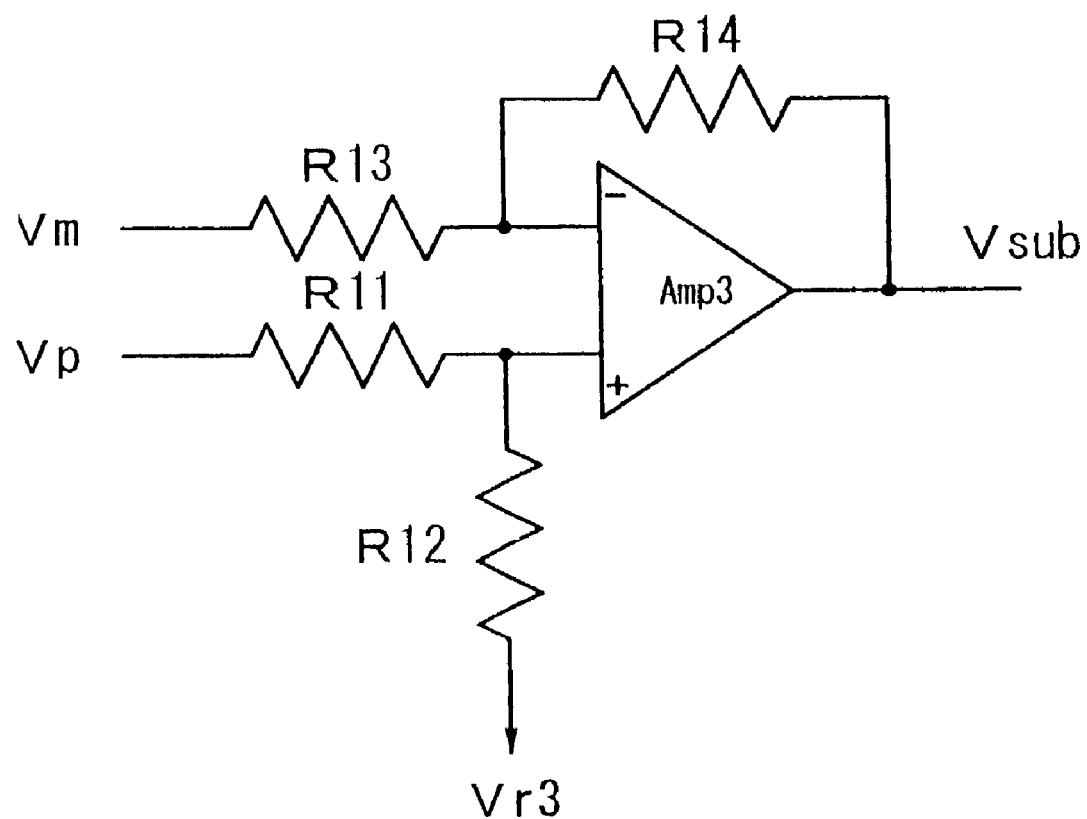
FIG. 18 is a circuit diagram of a subtraction circuit in the DC—DC converter shown in FIG. 17.

FIG. 18 a circuit diagram of a subtraction circuit in the DC—DC converter shown in FIG. 17. The subtraction circuit SUB1 includes an operational amplifier Amp3, a resistance R11, a resistance R12, a resistance R13, and a resistance R14. The feedback signal Vfb equal to Vp is inputted to the positive input terminal of the operational amplifier Amp3 via the resistance R11. A reference voltage signal Vr3 is inputted also to the positive input terminal of the operational amplifier Amp3 via the resistance R12. The output voltage control signal Vcont equal to Vm is inputted to the negative input terminal of the operational amplifier Amp3 via the resistance R13. In case of R11=R12=R13=R14, the difference signal Vsub outputted from the operational amplifier Amp3 is equal to Vp−Vm+Vr3. Therefore, the signal Vp−Vcont+Vr3 is applied to the negative input terminal of the error amplifier Amp1 in the DC—DC converter shown in FIG. 17.

When the reference voltage signal Vr2 for the error amplifier Amp1 is set to be the same as the reference voltage signal Vr3 for the subtraction circuit SUB1, the potential of an error amplifier output signal Verr increases when the feedback signal Vfb is lower than the output voltage control signal Vcont (Vcont>Vfb). Also, the potential of the error amplifier output signal Verr decreases when the feedback signal Vfb is higher than the output voltage control signal Vcont (Vcont<Vfb). Therefore, the DC—DC converter controlled in the PWM mode can prevent overshooting in the output voltage signal Vout even when the output voltage control signal Vcont changes stepwise, thereby obtaining the stable operation.

Figure 19:
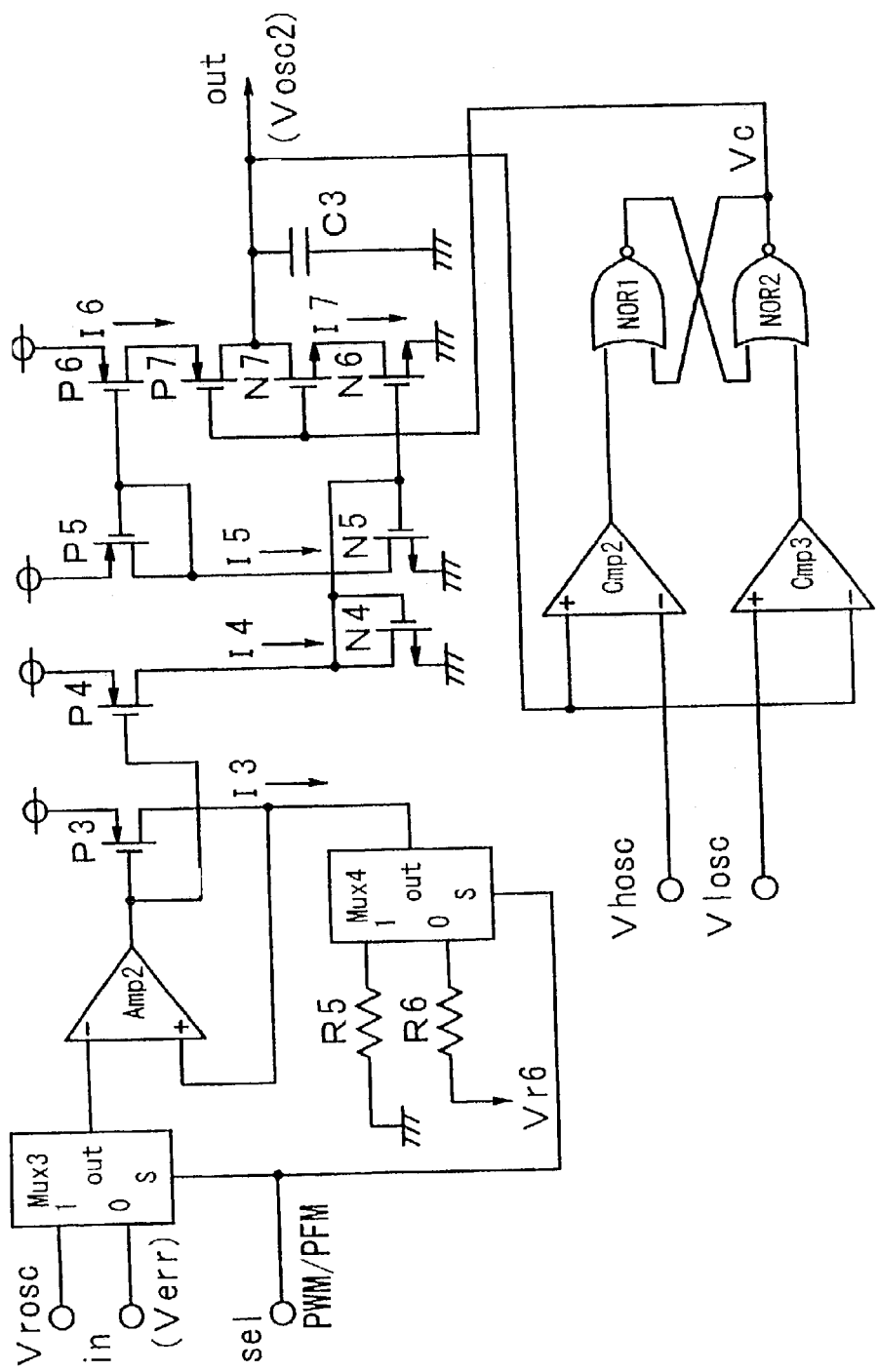
FIG. 19 is a block circuit diagram of an oscillator circuit in the DC—DC converter shown in FIG. 17.

FIG. 19 is a block circuit diagram of an oscillator circuit in the DC—DC converter shown in FIG. 17. The oscillator circuit OSC2 includes an operational amplifier Amp2, multi-plexer circuits Mux3 and Mux4, comparators Cmp2 and Comp3, p-channel transistors (MOSFET's) P3 through P7, n-channel transistors (MOSFET's) N4 through N7, a resistance R5, a resistance R6, NOR gates NOR1 and NOR2, a reference voltage Vr6 (first reference voltage), and a capacitor C3.

In FIG. 19, either of an internal reference voltage Vrosc or the error amplifier output signal Verr from the input terminal "in" is applied to the negative input terminal of the operational amplifier Amp2 constituting the oscillator circuit OSC2 according to the voltage of the input signal fed to the select terminal S from the multi-plexer circuit Mux3. The multi-plexer circuit Mux3 has the function same as those of the multi-plexer circuits Mux1 and Mux2 shown in FIG. 2. In the multi-plexer circuit Mux3, when the selection signal PWM/PFM fed to the select terminal S thereof is indicating the PWM mode, the internal reference voltage Vrosc is outputted, and the error amplifier output signal Verr is outputted when the selection signal PWM/PFM is indicating the PFM mode.

The drain of the p-channel transistor P3 and the positive input terminal of the operational amplifier Amp2 are connected to the output terminal of the multi-plexer circuit Mux4. The "1" input terminal of the multi-plexer circuit Mux4 is connected to the ground via the resistance R5, that is a second resistance circuit. The "0" input terminal of the multi-plexer circuit Mux4 is connected to the reference voltage Vr6 via the resistance R6, that is the first resistance circuit. The selection signal PWM/PFM is fed to the select terminal S of the multi-plexer circuit Mux4.

The configuration includes the operational amplifier Amp2, the p-channel transistor P3, the resistance R5, the resistance R6, and the reference voltage Vr6. In the PWM mode, the value of the current I3 flowing through the p-channel transistor P3 is Vrosc/R5. The value of the current I3 is (Verr−Vr6)/R6 in the PFM mode.

The inputs to the gates of the p-channel transistors P4 and P3 are common, and the voltages between the gates and the sources thereof are the same. Therefore, the drain current I4 of the p-channel transistor P4 is equal to the product of the current I3 and a ratio of the gate widths and the gate lengths of the p-channel transistor P3 and the p-channel transistor P4. This relation holds for the currents I5, I6 and I7 flowing through the other transistors.

The gates of the p-channel transistor P7 and the n-channel transistor N7 are connected to the NOR gate NOR2 constituting an RS flip-flop to supply an output signal Vc. Since the n-channel transistor N7 is ON and the p-channel transistor P7 is OFF when the output signal Vc from the RS flip-flop is "High", the current I7 is discharged from the capacitor C3 via the n-channel transistors N7 and N6. Since the n-channel transistor N7 is OFF and the p-channel transistor P7 is ON when the output signal Vc from the RS flip-flop is "Low", the current I6 is charged to the capacitor C3 via the p-channel transistors P6 and P7.

The potential of the triangular wave signal Vosc2 outputted to charge the capacitor C3 is monitored by the comparators Cmp2 and Cmp3, which receive internal reference voltages Vhosc and Vlosc having a relation of Vhosc>Vlosc. The potential of the triangular wave signal Vosc2 increases when the output signal Vc from the RS flip-flop is "Low". The output of the comparator Cmp2 becomes "High" when the potential of the triangular wave signal Vosc2 exceeds the internal reference voltage Vhosc, and the output signal Vc of the RS flip-flop changes to "High". Then, when the potential of the triangular wave signal Vosc2 becomes below the internal reference voltage Vlosc, the output of the comparator Cmp3 becomes "High", and the output signal Vc from the RS flip-flop returns to "Low".

Figure 20:
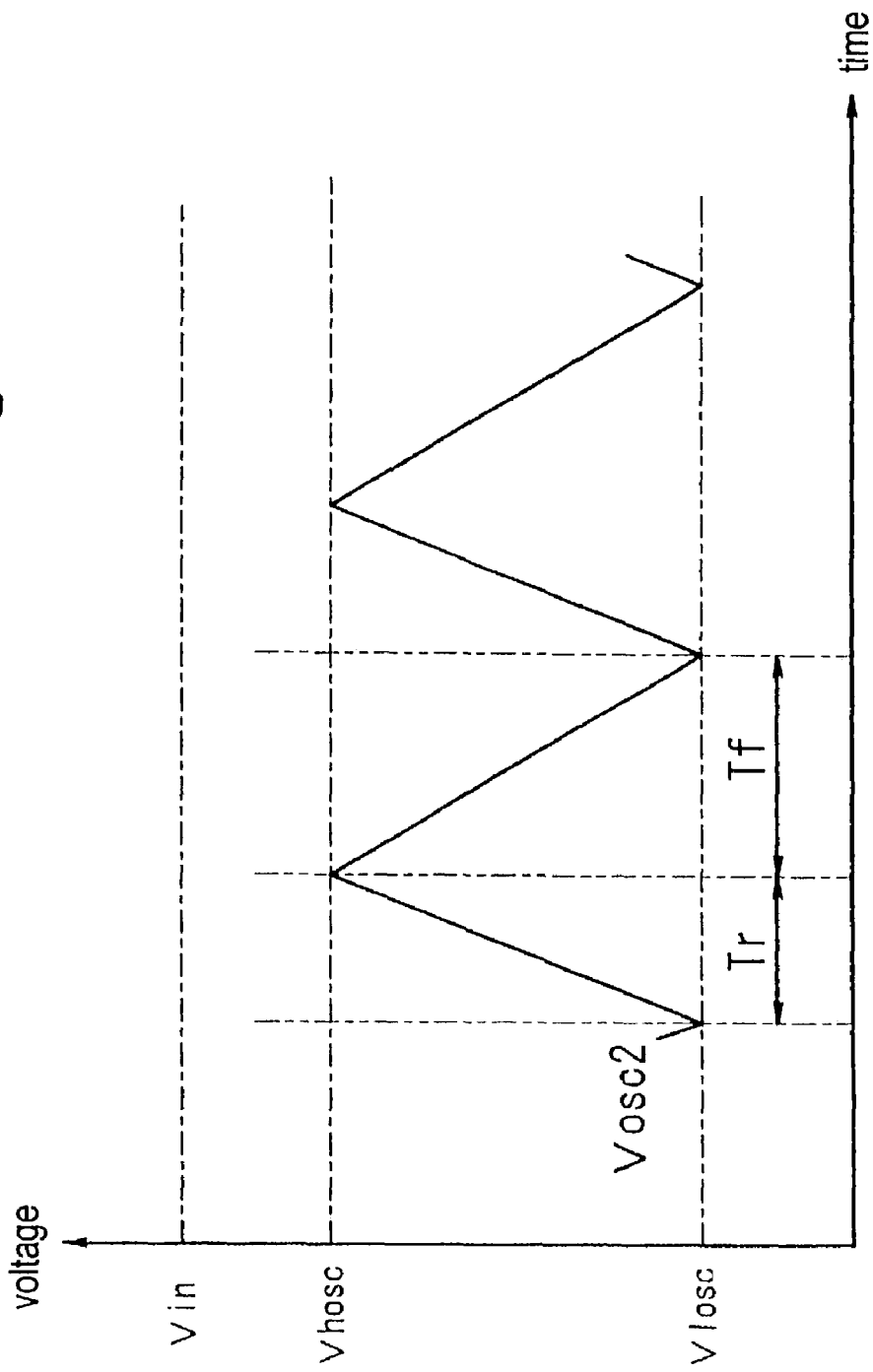
FIG. 20 is a chart showing a waveform of a triangular wave signal outputted from the oscillator circuit shown in FIG. 19.

FIG. 20 is a chart showing a waveform of the triangular wave signal outputted from the oscillator circuit shown in FIG. 19. The period Tr, for which the potential of the triangular wave signal Vosc2 rises, is expressed by the following expression where the triangular wave signal Vosc2 has the lower limit Vlosc and the upper limit Vhosc.

$$Tr = C3 \times (Vhosc - Vlosc)/I6$$

Similarly, the period Tf, for which the potential of the triangular wave signal Vosc2 falls, is expressed by the following expression.

$$Tf = C3 \times (Vhosc - Vlosc)/I7$$

The currents I6 and I7 are proportional to the current I3. Therefore, the oscillation frequency fosc2 of the triangular wave signal Vosc2 can be adjusted by changing the resistance R5, the resistance R6, the internal reference voltage Vrosc, the reference voltage Vr6, or the voltage value of the error amplifier output signal Verr applied to the input terminal in of the multi-plexer circuit Mux3.

The structure of the PWM/PFM selection circuit in the DC—DC converter according to the second embodiment is the same as that in the DC—DC converter according to the first embodiment.

Overshooting and the undershooting that are caused when the DC—DC converter according to the first embodiment shown in FIG. 1 switches between the PWM control mode and the PFM control mode will be described next. Then, an operation of the DC—DC converter having the oscillator circuit OSC2 with the structure described above will be explained.

Figure 21:
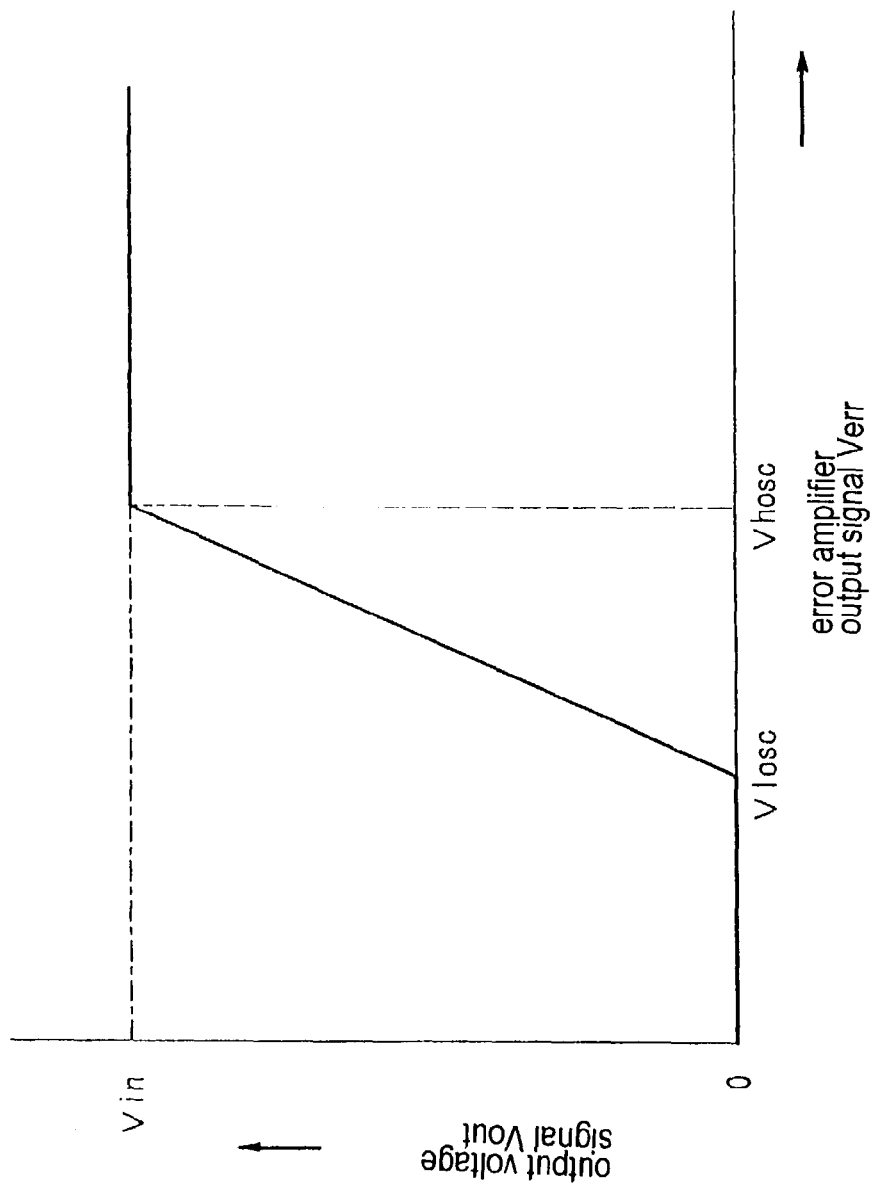
FIG. 21 is a graph showing a relationship between an output voltage signal and an error amplifier output signal when the DC—DC converter shown in FIG. 1 is controlled in the PWM control mode according to the triangular wave signal Vosc1.

FIG. 21 is a graph showing a relationship between the output voltage signal and the error amplifier output signal when the DC—DC converter shown in FIG. 1 is controlled in the PWM control mode according to the triangular wave signal Vosc1.

In the DC—DC converter shown in FIG. 1, in the PWM control mode, the triangular wave signal Vosc1 outputted from the oscillator circuit OSC1 shown in FIG. 3 is compared with the error amplifier output signal Verr, and the output voltage signal Vout is determined based on the value of the error amplifier output signal Verr. When the value of the error amplifier output signal Verr is lower than the lower limit Vlosc, the output voltage signal Vout is 0. When the value of the error amplifier output signal Verr is higher than the upper limit Vhosc, the output voltage signal Vout is equal to the input power supply voltage Vin.

Figure 22:
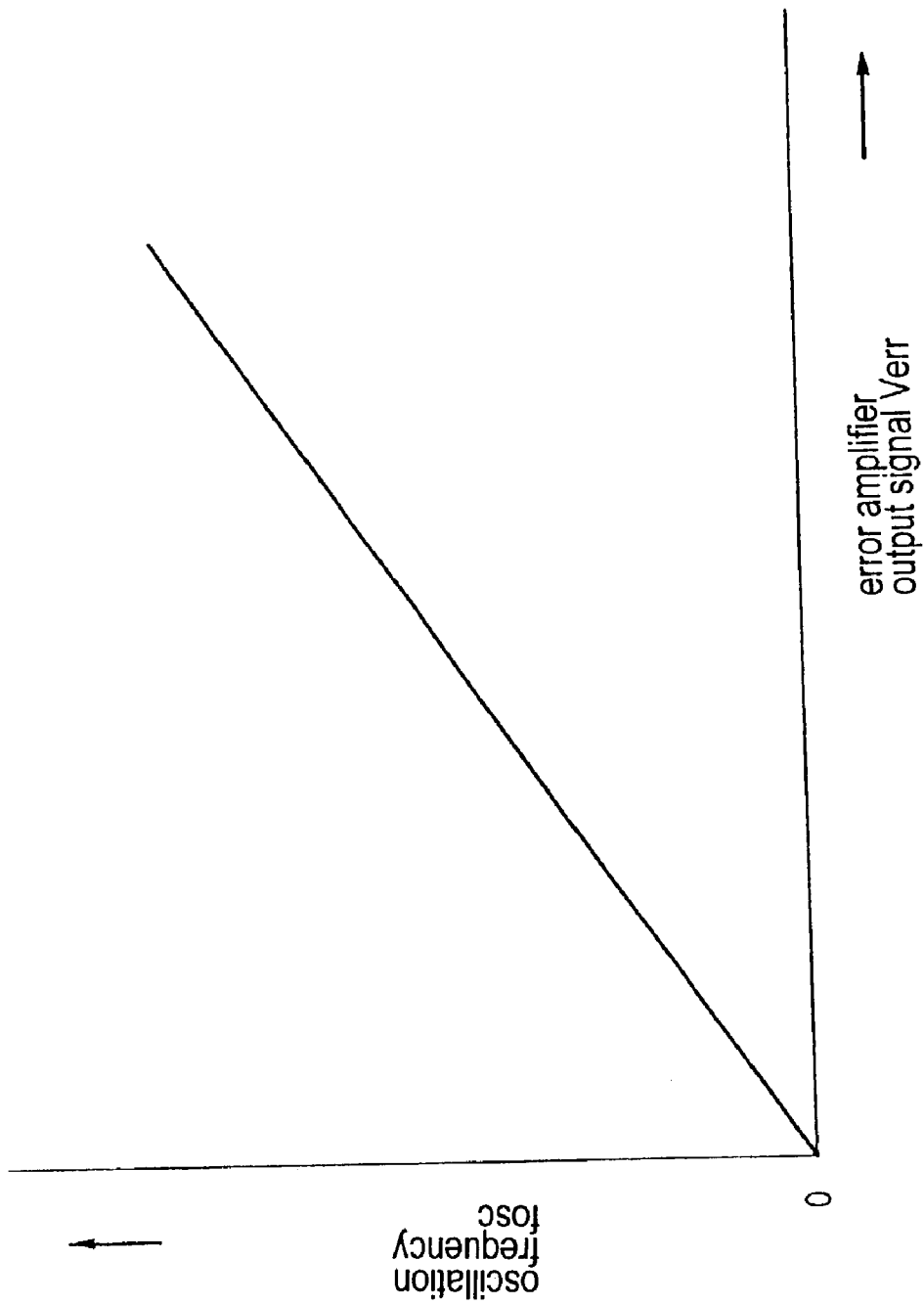
FIG. 22 is a graph showing a relationship between an oscillation frequency and an error amplifier output signal when the DC—DC converter shown in FIG. 1 is controlled in the PFM control mode according to the triangular wave signal Voscl.

FIG. 22 is a graph showing a relationship between the oscillation frequency and the error amplifier output signal when the DC—DC converter shown in FIG. 1 is controlled in the PFM control mode according to the triangular wave signal Vosc1. In the PFM control mode, in the oscillator circuit OSC1 shown in FIG. 3, the oscillation frequency fosc is determined in proportion to the value of the error amplifier output signal Verr, and the output current of the DC—DC converter is determined based on the determined oscillation frequency fosc.

Figure 23:
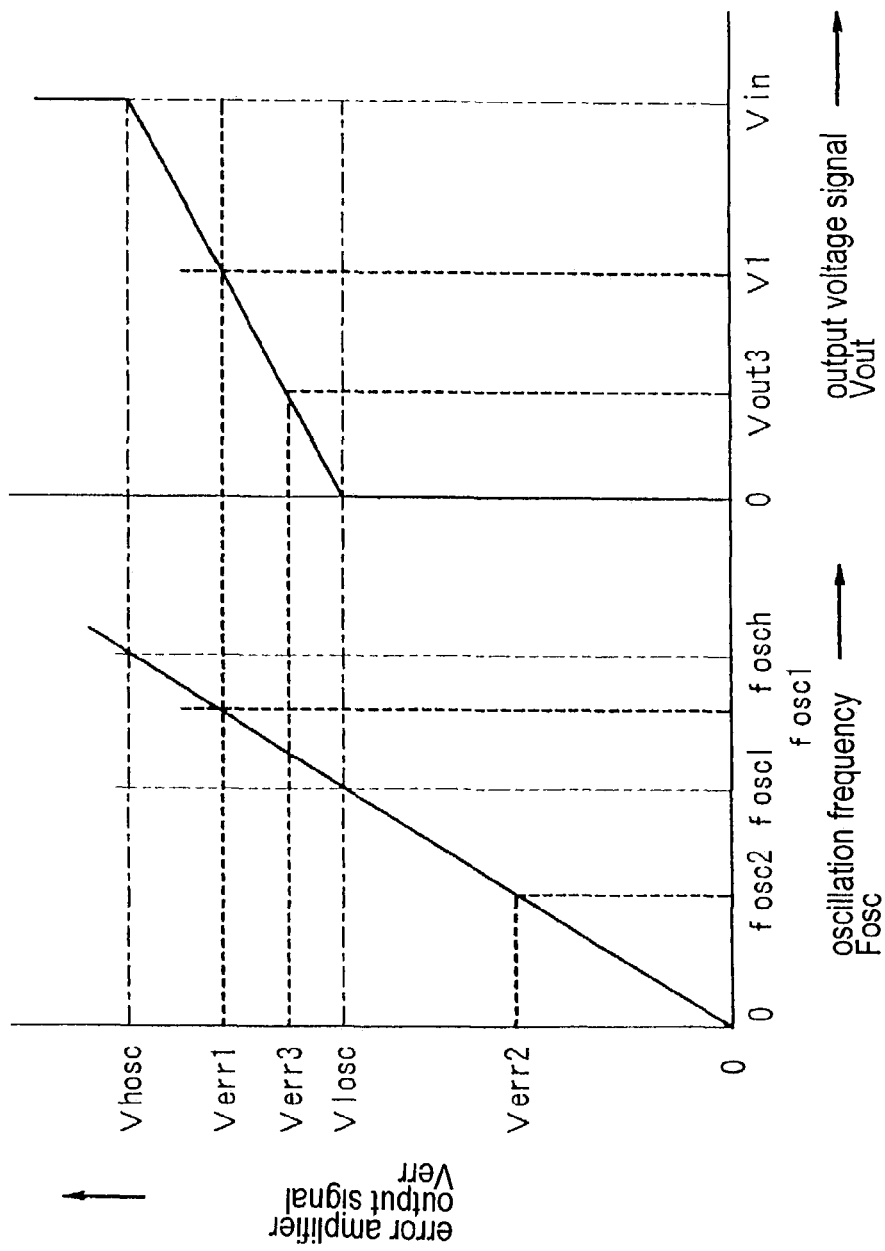
FIG. 23 is a graph describing operating points of the DC—DC converter shown in FIG. 1 relative to the error amplifier output signal in the PFM control mode and the PWM control mode.

FIG. 23 is a graph describing operating points of the DC—DC converter shown relative to the error amplifier output signal in the PFM control mode and the PWM control mode. When the value of the error amplifier output signal Verr is Verr1, the output voltage signal Vout is V1 in the PWM control mode and the oscillation frequency focs is fosc1 in the PFM control mode. That is, in the PFM control mode, the error amplifier output signal Verr is proportional to the oscillation frequency focs, and the oscillation frequency focs is proportional to the load current Iout. Accordingly, the error amplifier output signal Verr may decrease from the upper limit Vhosc down near to 0 according to the load current Iout. In the PWM control mode, the output voltage signal Vout is determined by the error amplifier output signal Verr.

Figure 24A:
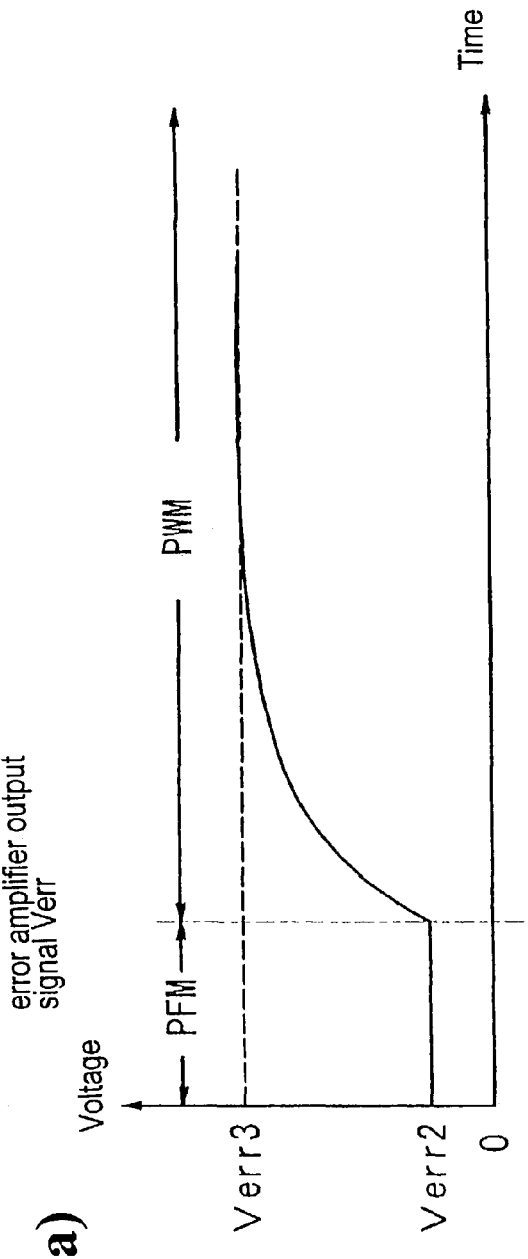
FIGS. 24(a) and 24(b) are charts explaining undershooting when the DC—DC converter shown in FIG. 1 is switched from the PFM control mode to the PWM control mode.
Figure 24B:
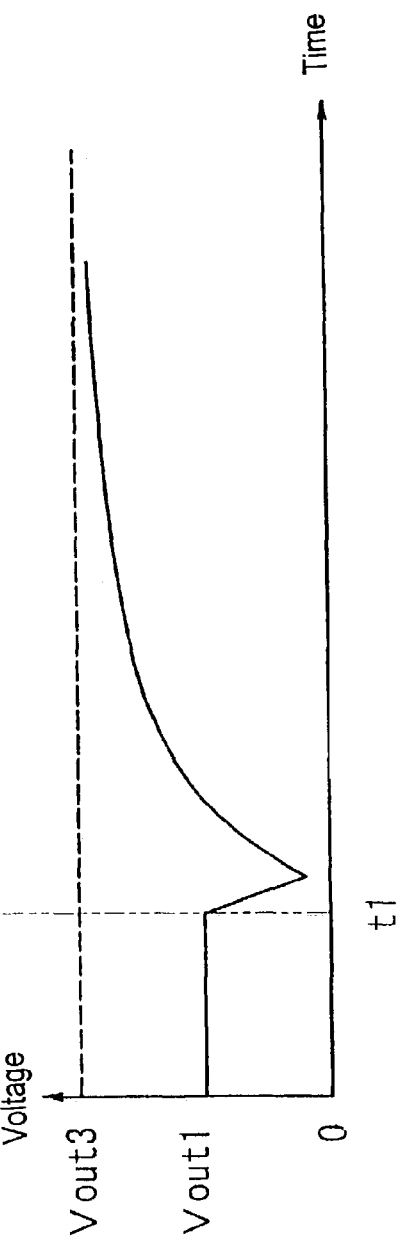

When the output voltage signal Vout of the DC—DC converter changes, or the load LOAD becomes heavier, the PFM control mode is switched to the PWM control mode. FIGS. 24(a) and 24(b) are charts explaining undershooting of the output voltage signal Vout when the PFM control mode is switched to the PWM control mode.

It is assumed that the output voltage signal Vout is Vout1 and the oscillation frequency corresponding to the output voltage signal Vout is fosc2 initially in the PFM control mode. It is also assumed that the error amplifier output signal Verr corresponding to a potential Vout3 changes to a potential Verr3 when the control mode is changed to the PWM due to the variation of the output voltage signal Vout. Even if the control mode is changed from the PFM to the PWM, the error amplifier output signal Verr in the DC—DC converter according to the first embodiment does not change sharply due to the functions of the phase compensation capacitor C1 and the phase compensation resistance R1. In other words, the error amplifier output signal Verr stays around the potential Verr2 corresponding to the oscillation frequency fosc2 for a while immediately after the control mode is changed to the PWM control mode.

Since the potential Verr2 is lower than the lower limit Vlosc, the n-channel transistor (MOSFET) N1 in the output stage is always ON and the p-channel transistor (MOSFET) P1 in the output stage is OFF by the function of the comparator Cmp1 for pulse width modulation. Moreover, the output voltage signal Vout falls sharply toward 0 V at the time t1 since the node of the output voltage signal Vout is grounded via the choke coil L and the n-channel transistor (MOSFET) N1. Then, when the feedback signal Vfb from the output voltage signal Vout decreases, the error amplifier Amp1 increases the output signal Verr again to the potential Verr3, and the output voltage signal Vout converges to the corresponding potential Vout3.

In the DC—DC converter according to the first embodiment, a similar problem occurs when the PWM control mode is switched to the PFM control mode. FIGS. 25(a) and 25(b) are charts explaining overshooting of the output voltage signal Vout when the PWM control mode is switched to the PFM control mode.

It is assumed that the output voltage signal Vout is Vout3 in the PWM control mode and the oscillation frequency changes to fosc2 at the time of changeover to the PFM control mode. The error amplifier output signal Verr from the error amplifier Amp1 has the potential Verr3 initially, and can not change sharply when the control mode is changed from the PWM to the PFM. In the one-shot circuit One-shot, a switching signal is generated relative to the p-channel transistor (MOSFET) P1 at a frequency higher than fosc2. As a result, an excess current flows into the smoothing capacitor Cout, and the output voltage signal Vout starts increasing at the time t2. Then, the error amplifier Amp1 decreases the error amplifier output signal Verr again to reach the potential Verr2 when the feedback signal Vfb from the output voltage signal Vout increases. The oscillation frequency of the switching signal becomes fosc2, and the output voltage signal Vout converges to the corresponding potential Vout1.

Figure 26:
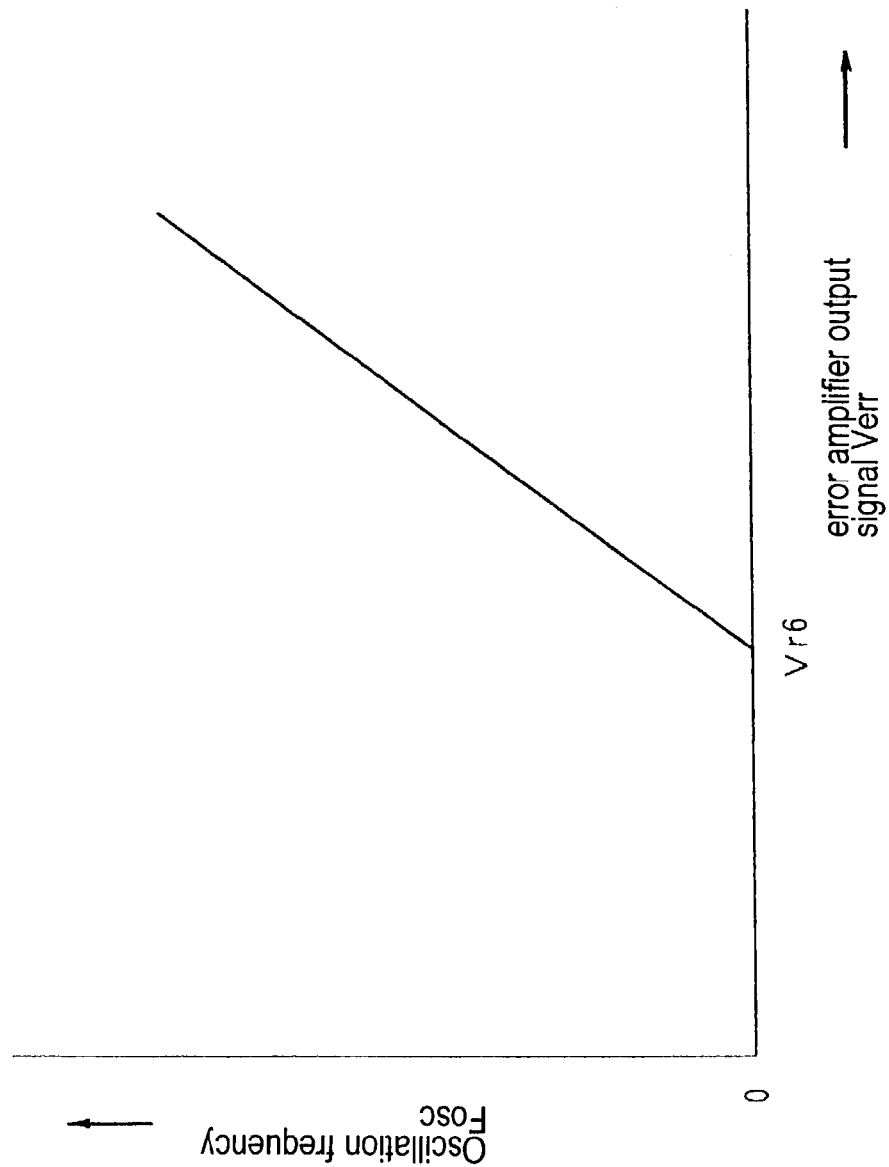
FIG. 26 is a graph showing a relationship between an oscillation frequency and an error amplifier output signal when the DC—DC converter shown in FIG. 1 is controlled in the PFM control mode according to a triangular wave signal Vosc2.
Figure 27:
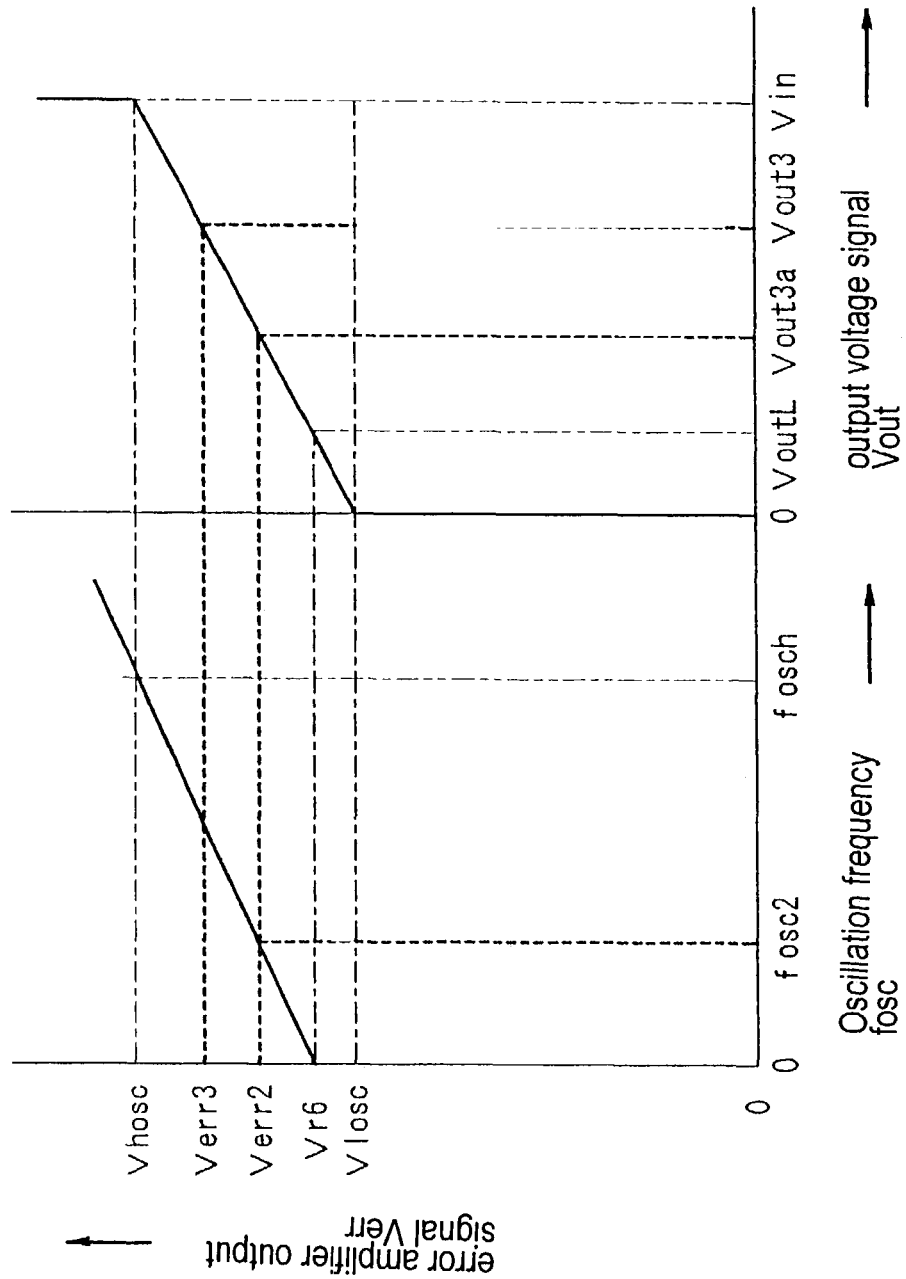
FIG. 27 is a graph describing operating points of the DC—DC converter shown in FIG. 17 relative to the error amplifier output signal in the PFM control mode and the PWM control mode.
Figure 28:
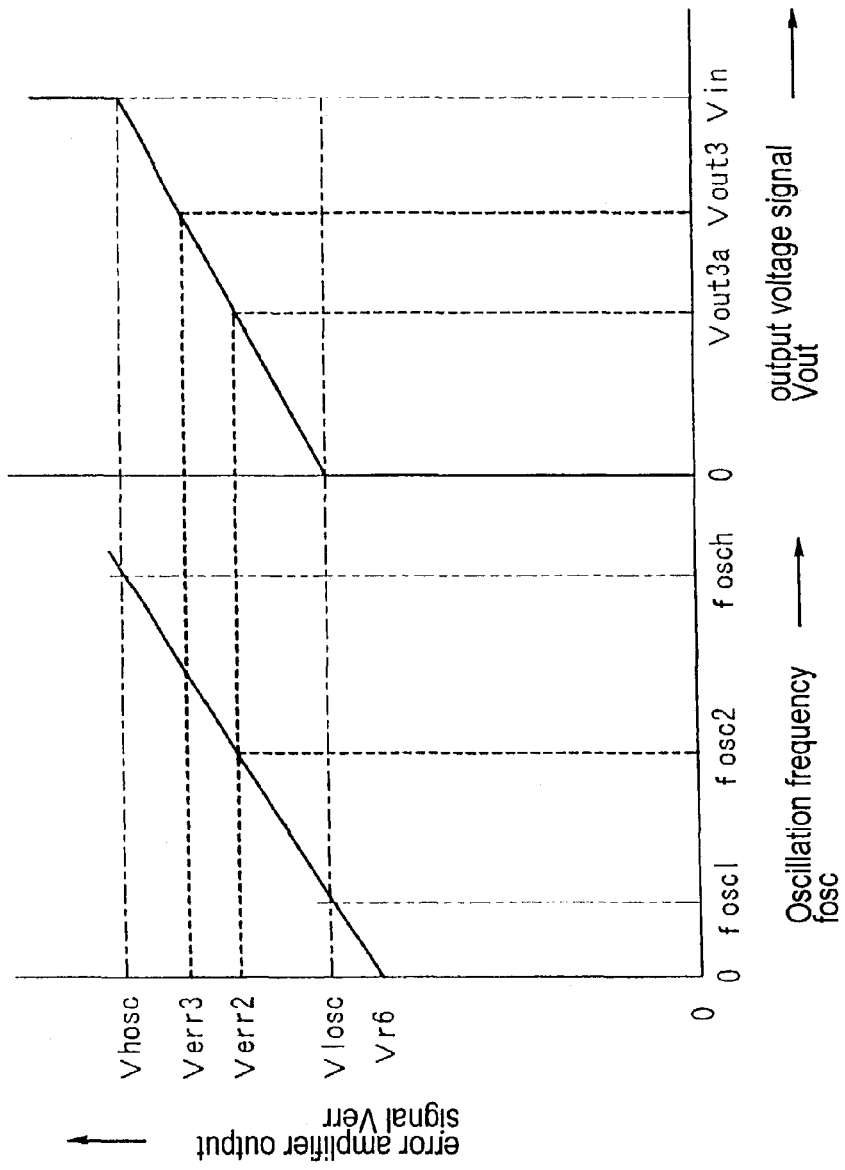
FIG. 28 is a graph describing operating points of the DC—DC converter shown in FIG. 17 relative to the error amplifier output signal in the PFM control mode and the PWM control mode.
Figure 29:
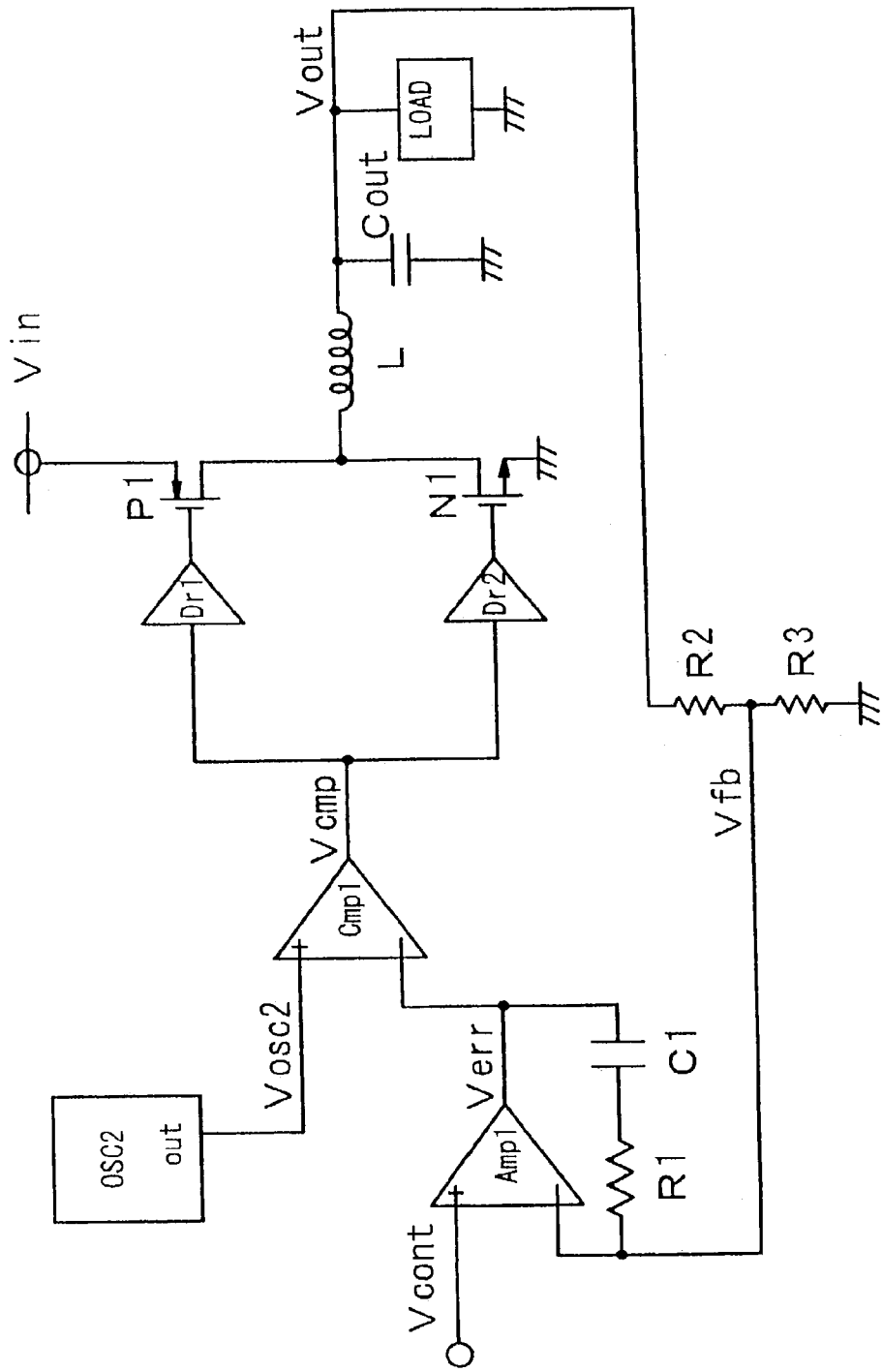
FIG. 29 is a block circuit diagram of a conventional step-down DC—DC converter with the PWM control mode.
Figure 30A:
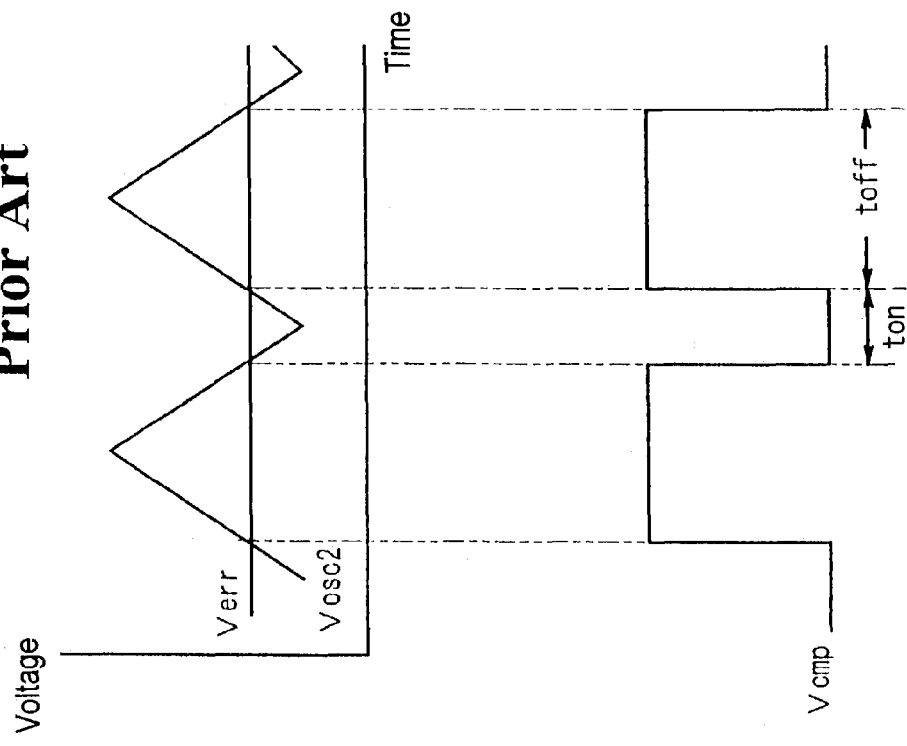
FIGS. 30(a) and 30(b) are charts showing waveforms representing an operation of the PWM control mode in the conventional step-down DC—DC converter shown in FIG. 29.
Figure 30B:
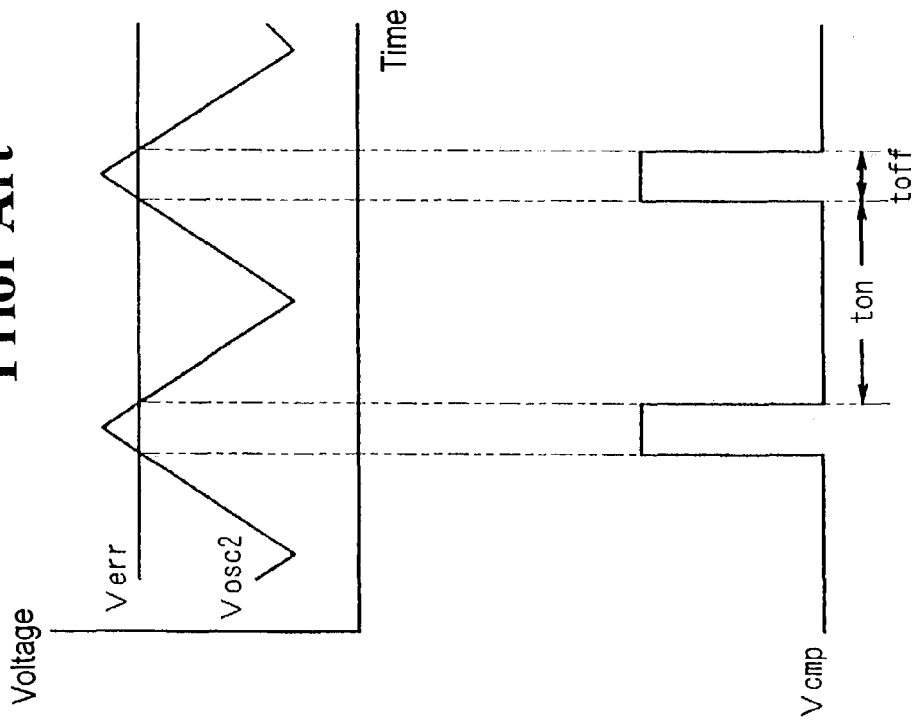
Figure 31:
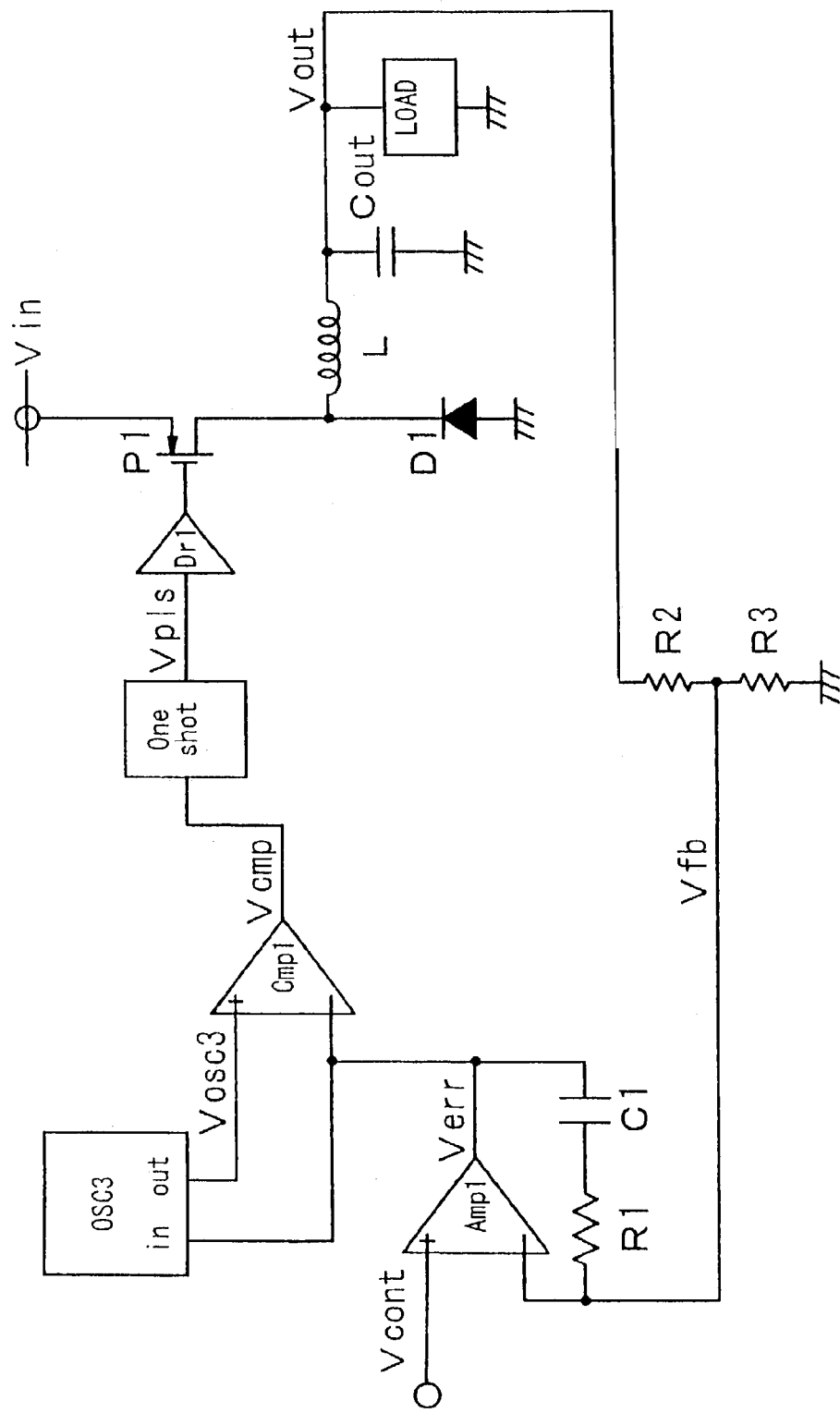
FIG. 31 is a block circuit diagram of a conventional step-down DC—DC converter with the PFM control mode.
Figures 32A, 32B, 32C, 32D:
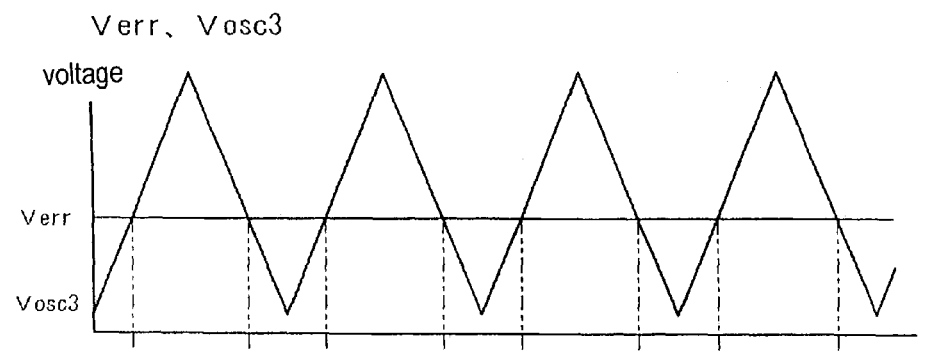
FIGS. 32(a) to 32(d) are charts showing waveforms representing an operation of the PFM control mode in the conventional DC—DC converter.

An operation of the DC—DC converter shown in FIG. 17 will be described next. FIG. 26 is a graph showing a relationship between the oscillation frequency fosc and the error amplifier output signal Verr in the PFM control mode according to the triangular wave signal Vosc2. FIG. 27 and FIG. 28 are graphs describing operating points relative to the error amplifier output signal Verr in the PFM control mode and the PWM control mode.

An operation of the DC—DC converter using the oscillator circuit shown in FIG. 19 will be described next. In the DC—DC converter, it is possible to suppress undershooting and overshooting of the output voltage signal Vout.

In the oscillator circuit OSC2 shown in FIG. 19, the oscillation frequency fosc of the triangular wave signal Vosc2 is determined by the current I3. Since the current I3 is (Verr−Vr6)/R6 in the PFM control mode, the oscillation frequency fosc is determined in proportion to the value of (Verr−Vr6) in the range in which the error amplifier output signal Verr is larger than the reference voltage Vr6 (Verr>Vr6), as shown in FIG. 26.

In the range of Verr<Vr6, in the operational amplifier Amp2 shown in FIG. 19, the outputs from the multiplexer circuits Mux3 and Mux4 are compared, and the output signal becomes "High". Accordingly, the p-channel transistors P3 and P4 are shut off, and the currents I3 and I4 become zero, so that the oscillation frequency fosc becomes 0 as shown in FIG. 26.

FIG. 27 a graph describing operating points relative to the error amplifier output signal Verr in the PFM control mode and the PFM control mode. In FIG. 27, the reference voltage Vr6 is assumed to be higher than the lower limit Vlosc of the error amplifier output signal Verr.

When the output voltage signal Vout changes, the control mode of the DC—DC converter is switched from the PFM mode to the PWM mode. It is assumed that the initial output voltage signal Vout in the PFM control mode is Vout3a, and the oscillation frequency corresponding thereto is fosc2. It is also assumed that the error amplifier output signal Verr corresponding to the potential Vout3 changes to Verr3 when the output voltage signal Vout changes and the control mode is switched to the PWM control mode.

Even when the control mode is changed from the PFM mode to the PWM mode, due to the phase compensation capacitor C1 and the phase compensation resistance R1, the error amplifier output signal Verr does not change sharply as in the DC—DC converter according to the first embodiment. In other words, for a while immediately after the control mode is changed to the PWM mode, the error amplifier output signal Verr stays around the potential Verr2 corresponding to the oscillation frequency fosc2. In this case, the output voltage signal Vout changes toward the voltage Vout3a corresponding to the error amplifier output signal Verr immediately after the control mode is changed over to the PWM mode. Then, the error amplifier Amp1 increases the error amplifier output signal Verr in response to the fall of the feedback signal Vfb, which is the feedback signal of the output voltage signal Vout.

It is possible to set the error amplifier output signal Verr corresponding to the oscillation frequency fosc2 determined by the value of the reference voltage Vr6 to have the potential Verr2, so that the potential difference between the potential Verr2 and the potential Verr3 in the PWM control mode becomes small. Therefore, it is possible to shorten the period until the error amplifier output signal Verr is set at the potential Verr3 after the changeover to the PWM control mode. Therefore, a shift between the operating points in the PWM control mode and the absolute value of the undershooting is reduced.

In the DC—DC converter according to the second embodiment of the invention, the same effect can be expected when the PWM control mode is changed to the PFM control mode. It is assumed that the output voltage signal Vout is Vout3 in the PWM control mode, and the oscillation frequency changes to fosc2 in association with the changeover to the PFM control mode. When the control mode is changed from the PWM mode to the PFM mode at the time t2, the error amplifier output signal Verr, which is Vout3 initially, does not change sharply, and the p-channel transistor (MOSFET) P1 is switching at a frequency higher than the oscillation frequency fosc2. However, when the potential difference between Verr2 of the error amplifier output signal Verr and Verr3 thereof in the PWM control mode is small, it is possible to shorten the period for which the error amplifier output signal Verr reaches the potential Verr2 from the potential Verr3. Therefore, the overshooting in the PWM control mode is reduced.

As described above, when the operating points for the error amplifier output signal Verr are set in the PFM control mode and the PWM control mode as shown in FIG. 27, the potential Verr2 of the error amplifier output signal Verr is always higher than the lower limit Vlosc even if the oscillation frequency fosc is close to 0 when the PFM control mode is changed to the PWM control mode. Therefore, the n-channel output transistor (MOSFET) N1 never become ON continuously, and the p-channel output transistor (MOSFET) P1 never become OFF. Also, the output voltage signal Vout never fall sharply toward 0 upon shifting to the PWM control mode.

Although the overshooting of the output voltage signal Vout is reduced when the PWM control mode is changed to the PFM control mode, it is not preferable to shift to the PFM control mode when the output voltage signal Vout in the PWM control mode is lower than the potential VoutL corresponding to the reference voltage Vr6. This is because the oscillation frequency fosc in the PFM control mode becomes 0 and the oscillation stops at the potential of the error amplifier output signal Verr corresponding to the output voltage signal Vout lower than the potential VoutL.

FIG. 28 a graph describing operating points relative to the error amplifier output signal Verr in the PFM control mode and the PWM control mode. Unlike FIG. 27, the reference voltage Vr6 is set lower than the lower limit Vlosc of the error amplifier output signal Verr. This setting prevents the oscillation frequency fosc in the PFM control mode from becoming 0 when the PWM control mode is changed to the PFM control mode, so that the oscillation does not stop.

In the case that the PFM control mode is changed to the PWM control mode, it is assumed that the initial value of the output voltage signal Vout is Vout3 and the oscillation frequency corresponding thereto is fosc2. It is also assumed that the potential of the output voltage signal vout is Vout3 immediately after the changeover to the PWM control mode and the potential of the error amplifier output signal Verr corresponding thereto is Verr3. As in the case shown in FIG. 27, it is possible to set the error amplifier output signal Verr corresponding to the oscillation frequency fosc2 determined by the value of the reference voltage Vr6 to have the potential Verr2, so that the potential difference between the potential Verr2 and the potential Verr3 in the PWM control mode becomes small. Therefore, it is possible to shorten the period until the error amplifier output signal Verr is set at the potential Verr3 after the changeover to the PWM control mode. Therefore, a shift between the operating points in the PWM control mode and the absolute value of the undershooting are reduced.

When the oscillation frequency fosc before the shift to the PWM control mode is lower than the lower oscillation frequency limit foscl corresponding to the lower limit Vlosc of the error amplifier output signal Verr, the n-channel output transistor (MOSFET) N1 is ON continuously after the shift to the PWM control mode. Therefore, the output voltage signal Vout drops sharply toward 0 in shifting from the PFM control mode to the PWM control mode. To avoid this problem, it is preferable not to use the oscillation frequency fosc in the PFM control mode lower than the lower oscillation frequency limit foscl.

As described above, in the DC—DC converter according to the second embodiment, the reference voltage Vr6 is set higher than the lower limit Vlosc of the error amplifier output-signal Verr (Vr6>Vlosc) when the lower voltage limit of the output voltage signal Vout is confined within a certain range. When the range of the output voltage signal Vout is expanded to 0 V and the load current Iout is provided with a certain lower limit, the reference voltage Vr6 is set lower than the lower limit Vlosc of the error amplifier output signal Verr (Vr6<Vlosc). To eliminate the limitations of the output voltage signal Vout and the load current Iout, the reference voltage Vr6 is set equal to the lower limit Vlosc of the error amplifier output signal Verr.

In FIGS. 27 and 28, the operating point in the PFM control mode corresponding to the upper limit Vhosc of the error amplifier output signal Verr is set at the upper oscillation frequency limit fosch, and the PFM control mode at a frequency higher than the upper oscillation frequency limit fosch is not considered. This is because the control mode is changed to the PFM mode to decrease the switching frequency in association with the decrease of the load current, thereby obtaining high conversion efficiency in a wide load range.

In the oscillator circuit OSC2 shown in FIG. 19 according to the second embodiment, it is possible to set the oscillation frequency in the PWM control mode and the oscillation frequency corresponding to the error amplifier output signal Verr in the PFM control mode independently. In the conventional DC—DC converters, a user sets the oscillation frequency thereof in the PWM control mode. For this purpose, it is preferable to provide the resistance R5 constituting the integrated oscillator circuit OSC2 as an external part.

When a circuit for setting the resistance R6 and the reference voltage Vr6 is provided as an external part of the integrated circuit, it is possible for the user to adjust the performances in the PFM control mode. Since it is possible to set the oscillation frequency independently in the PWM control mode and the PFM control mode, there is no restriction in setting the oscillation frequency when the oscillation frequency is set for either the PWM control mode or the PFM control mode, or for the PWM control mode and the PFM control mode.

As described above, the DC—DC converter has the function of switching the PWM/PFM control mode, thereby obtaining the high conversion efficiency in a wide load range. It is also possible to change the output voltage at a high speed even when the DC—DC converter is in the PFM control mode under a light load condition.

The DC—DC converter according to the invention does not generate the overshooting in the output voltage signal even when the output voltage control signal changes stepwise. Further, it is possible to suppress the undershooting and the overshooting and reduce the absolute values thereof when the PWM mode control is changed to the PFM control mode, thereby shortening the period that the undershooting or the overshooting continues.

While the invention has been explained with reference to the specific embodiments of the invention, the explanation is illustrative and the invention is limited only by the appended claims.

What is claimed is:

1. A DC—DC converter for converting a first DC voltage to a second DC voltage and supplying the second DC voltage to a load, comprising:
    a semiconductor switch device for changing the first DC voltage to the second DC voltage,
    means for providing a first feedback control mode and a second feedback control mode, said providing means being connected to the semiconductor switch device, and
    control mode selection means connected to the providing means for selecting one of the first feedback control mode and the second feedback control mode, said control mode selection means selecting the second feedback control mode when a load current flowing through the load is below a predetermined value, and selecting the first feedback control mode irrespective of the load current when the second DC voltage supplied to the load changes.

2. A DC—DC converter according to claim 1, wherein said first feedback control mode is a pulse width modulation control mode, and said second feedback control mode is a pulse frequency modulation control mode.

3. A DC—DC converter for converting a first DC voltage to a second DC voltage and supplying the second DC voltage to a load, comprising:
 a semiconductor switch device for changing the first DC voltage to the second DC voltage,
 oscillating means for generating a triangular wave signal to define a switching frequency of the semiconductor switching device,
 amplifying means for receiving an output voltage control signal as a reference voltage and a detected voltage fed back to correspond to the second DC voltage supplied to the load, said amplifying means amplifying a voltage difference between the output voltage control signal and the detected voltage,
 pulse-width-modulation control means connected to the semiconductor switch device, said control means, upon switching between a pulse width modulation control mode and a pulse frequency modulation control mode, comparing the triangular wave signal from the oscillating means and the voltage difference from the amplifying means, and modulating a width of a driving pulse for switching the semiconductor switching device, and
 control mode selection means connected to the control means for selecting one of the pulse width control mode and the pulse frequency modulation control mode, said control mode selection means selecting the pulse frequency control mode when a load current flowing through the load is below a predetermined value, and selecting the pulse width modulation control mode irrespective of the load current when the second DC voltage supplied to the load changes.

4. A DC—DC converter according to claim 3, wherein said control mode selection means includes a load current evaluation circuit for determining the load current, and a voltage change detection circuit for detecting a change in the second DC voltage supplied to the load.

5. A DC—DC converter according to claim 4, wherein said voltage change detection circuit detects the change in the second DC voltage supplied to the load based on a change in the output voltage control signal as the reference voltage and a change in an output voltage signal supplied to the load.

6. A DC—DC converter according to claim 4, wherein said voltage change detection circuit detects a change in the second DC voltage supplied to the load based on a balance of the voltage difference from the amplifying means and a feedback signal fed back to the amplifying means.

7. A DC—DC converter according to claim 3, wherein said amplifying means includes a first analog amplifier circuit formed of a differential amplifier circuit and having a fixed operating point, and a second analog amplifier circuit connected to the first analog amplifier circuit in cascade and having a fixed operating point.

8. A DC—DC converter according to claim 3, wherein said oscillating means generates the triangular wave signal having a oscillation frequency proportional to a difference between the voltage difference amplified by the amplifying means and a first reference voltage when the control mode selecting means selects the pulse width modulation control mode.

9. A DC—DC converter according to claim 3, wherein said oscillating means generates the triangular wave signal having a oscillation frequency proportional to a current flowing through a first resistance circuit connecting a node set at a potential of the difference voltage amplified by the amplifying means and a node set at a first reference voltage when the control mode selection means selects the pulse frequency modulation control mode, and said oscillating means generates the triangular wave signal having an oscillation frequency proportional to a current flowing through a second resistance circuit connecting a second reference voltage and a ground potential when the control mode selection means selects the pulse width modulation control mode.

10. A according to claim 9, wherein said oscillating means is formed of a monitoring circuit for defining a lower voltage limit of the triangular wave signal.

11. A DC—DC converter according to claim 10, wherein in said oscillating means, the first reference voltage is set to be equal to the lower voltage limit of the triangular wave signal defined by the monitoring circuit.

12. A DC—DC converter according claim 10, wherein in said oscillating means, the first reference voltage is set to be higher than the lower voltage limit of the triangular wave signal defined by the monitoring circuit, and a lower voltage limit of an output voltage signal to the load is set to be an output voltage signal when an error amplifier output signal from the amplifying means is equal to the first reference voltage in the pulse width modulation control mode.

13. A DC—DC converter according claim 10, wherein in said oscillating means, the first reference voltage is set to be lower than the lower voltage limit of the triangular wave signal defined by the monitoring circuit, and the triangular wave signal has the oscillation frequency with a lower oscillation frequency limit when an error amplifier output signal from the amplifying means is equal to the lower voltage limit of the triangular wave signal in the pulse frequency modulation control mode.

14. A DC—DC converter for converting a first DC voltage to a second DC voltage, and for supplying the second DC voltage to a load, the converter comprising:
 a semiconductor switch device for changing the first DC voltage to the second DC voltage,
 means for providing a first feedback control mode that is a pulse width modulation control mode, and a second feedback control mode, said providing means being in communication with the semiconductor switch device, and
 control mode selection means for selecting one of the first feedback control mode and the second feedback control mode, said control mode selection means being in communication with the providing means and being capable of selecting the second feedback control mode when a load current flowing through the load is below a predetermined value, and being capable of selecting the first feedback control mode irrespective of the load current when the second DC voltage supplied to the load changes.

* * * * *

UNITED STATES PATENT AND TRADEMARK OFFICE
CERTIFICATE OF CORRECTION

| | |
|---|---|
| PATENT NO. | : 7,061,213 B2 |
| APPLICATION NO. | : 10/613017 |
| DATED | : June 13, 2006 |
| INVENTOR(S) | : Yutaka Yoshida |

Page 1 of 1

It is certified that error appears in the above-identified patent and that said Letters Patent is hereby corrected as shown below:

Please change column 12, line 10, "$\_{out}$ ud" to -- out_ud--, column 15, line 55, "FIG. 12(d)" to -- FIG. 12(d). --, column 23, line 61, "Verr<Vr6" to -- Verr$\leq$Vr6 --, column 24, line 3, "PFM" to -- PWM --, and column 25, line 56, "output-signal" to -- output signal --.

Signed and Sealed this

Fifth Day of September, 2006

JON W. DUDAS
*Director of the United States Patent and Trademark Office*